US012722408B2

(12) United States Patent
Koga

(10) Patent No.: US 12,722,408 B2
(45) Date of Patent: Sep. 1, 2026

(54) HEAD MODULE SUPPORT MECHANISM, LIQUID JET HEAD, AND LIQUID JET SYSTEM

(71) Applicant: FUJIFILM Corporation, Tokyo (JP)

(72) Inventor: Takehiko Koga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 18/765,355

(22) Filed: Jul. 8, 2024

(65) Prior Publication Data

US 2024/0359493 A1 Oct. 31, 2024

Related U.S. Application Data

(63) Continuation of application No. PCT/JP2022/045976, filed on Dec. 14, 2022.

(30) Foreign Application Priority Data

Jan. 18, 2022 (JP) ................................ 2022-005966
Apr. 21, 2022 (JP) ................................ 2022-070162

(51) Int. Cl.
*B41J 25/00* (2006.01)

(52) U.S. Cl.
CPC .......... *B41J 25/001* (2013.01); *B41J 2202/14* (2013.01); *B41J 2202/20* (2013.01)

(58) Field of Classification Search
CPC .. B41J 25/001; B41J 2202/14; B41J 2202/20; B41J 2/01
See application file for complete search history.

(56) References Cited

U.S. PATENT DOCUMENTS 9,227,444 B1 1/2016 Ben-Noon
10,899,149 B2 1/2021 Muñoz et al.
(Continued)

FOREIGN PATENT DOCUMENTS

JP S6132621 2/1986
JP H11348248 12/1999
(Continued)

OTHER PUBLICATIONS

1 "Search Report of Europe Counterpart Application", issued on Mar. 18, 2025, p. 1-p. 9.
(Continued)

*Primary Examiner* — Sharon Polk
(74) *Attorney, Agent, or Firm* — JCIPRNET

(57) ABSTRACT

Provided are a head module support mechanism, a liquid jet head, and a liquid jet system which can ensure a defined position accuracy in movement of a head module. Provided is a head module support mechanism (36) that supports a head module of a liquid jet head including one or more head modules, the head module support mechanism including: a fixing portion (42) that is joined to a frame of the liquid jet head; a movement portion (40) that supports the head module and is supported to be movable in a first direction with respect to the fixing portion; a first direction movement portion that moves the movement portion that supports the head module in the first direction with respect to the fixing portion; and a guide portion that guides the movement portion with respect to the fixing portion and to which a rolling guide (200) extending in the first direction is applied.

18 Claims, 17 Drawing Sheets

(56) References Cited

U.S. PATENT DOCUMENTS

| | | | |
|---|---|---|---|
| 2014/0259595 | A1 | 9/2014 | Von Essen et al. |
| 2015/0022588 | A1 | 1/2015 | Rodriguez et al. |
| 2016/0347098 | A1 | 12/2016 | Von Essen et al. |
| 2017/0217231 | A1 | 8/2017 | Von Essen et al. |
| 2018/0257409 | A1 | 9/2018 | Meuleman |
| 2019/0283415 | A1 | 9/2019 | Miyagawa et al. |
| 2021/0405575 | A1 | 12/2021 | Fukuma |
| 2022/0001663 | A1 | 1/2022 | Hashimoto |

FOREIGN PATENT DOCUMENTS

| | | | |
|---|---|---|---|
| JP | 2003148485 | | 5/2003 |
| JP | 2006091616 | | 4/2006 |
| JP | 2012125986 | | 7/2012 |
| JP | 2014188985 | | 10/2014 |
| JP | 2014198451 | | 10/2014 |
| JP | 5626585 | B2 * | 11/2014 |
| JP | 5940183 | B2 * | 6/2016 |
| JP | 2018079582 | | 5/2018 |
| JP | 2018114722 | | 7/2018 |
| JP | 2019147390 | | 9/2019 |
| JP | 2019162867 | | 9/2019 |
| WO | 2020116519 | | 6/2020 |
| WO | 2020196622 | | 10/2020 |

OTHER PUBLICATIONS

"International Search Report (Form PCT/ISA/210) of PCT/JP2022/045976," mailed on Jan. 31, 2023, with English translation thereof, pp. 1-7.

"Written Opinion of the International Searching Authority (Form PCT/ISA/237) of PCT/JP2022/045976," mailed on Jan. 31, 2023, with English translation thereof, pp. 1-12.

* cited by examiner

HEAD MODULE SUPPORT MECHANISM, LIQUID JET HEAD, AND LIQUID JET SYSTEM

CROSS-REFERENCE TO RELATED APPLICATIONS

The present application is a Continuation of PCT International Application No. PCT/JP2022/045976 filed on Dec. 14, 2022 claiming priorities under 35 U.S.C § 119(a) to Japanese Patent Application No. 2022-005966 filed on Jan. 18, 2022 and Japanese Patent Application No. 2022-070162 filed on Apr. 21, 2022. Each of the above applications is hereby expressly incorporated by reference, in its entirety, into the present application.

BACKGROUND OF THE INVENTION

1. Field of the Invention

The present invention relates to a head module support mechanism, a liquid jet head, and a liquid jet system.

2. Description of the Related Art

In a liquid jet head using an ink jet method, a line type liquid jet head having a structure in which a plurality of head modules are connected to each other is known. The liquid jet head having such a structure has high accuracy and can contribute to improvement in yield. In addition, the replacement in units of modules can be performed, which can also contribute to improvement in maintenance efficiency.

JP6228660B describes a liquid jet head using an ink jet method, which is called a printing bar including a plurality of fluid jet modules. The printing bar described in JP6228660B comprises the fluid jet module mounted on a module mount having a horizontal portion and a vertical portion. The vertical portion of the module mount has a protruding portion that is fitted to a clamp assembly, a protruding portion is fitted to a recess portion of the clamp assembly, and the clamp assembly is joined to the module mount.

Further, the printing bar comprises an adjustment mechanism that moves the module mount with respect to the clamp assembly in a direction in which the fluid jet modules are arranged, to adjust the positions of the fluid jet modules in the same direction.

SUMMARY OF THE INVENTION

However, in a case in which the position of the fluid jet module is adjusted by moving the module mount on which the fluid jet module is mounted with respect to the clamp assembly, a guide between the clamp assembly and the module mount is a slip guide, and it is difficult to ensure a defined position accuracy in the movement of the fluid jet module.

The present invention has been made in view of such circumstances, and an object of the present invention is to provide a head module support mechanism, a liquid jet head, and a liquid jet system which can ensure a defined position accuracy in movement of a head module.

A head module support mechanism according to an aspect of the present disclosure supports a head module of a liquid jet head including one or more head modules, the head module support mechanism comprising: a fixing portion that is joined to a frame of the liquid jet head; a movement portion that supports the head module and is supported to be movable in a first direction with respect to the fixing portion; a first direction movement portion that moves the movement portion that supports the head module in the first direction with respect to the fixing portion; and a guide portion that guides the movement portion with respect to the fixing portion and to which a rolling guide extending in the first direction is applied.

With the module support mechanism according to the aspect of the present disclosure, the rolling guide extending in the first direction is applied to the guide portion that guides the movement portion with respect to the fixing portion. As a result, the defined position accuracy in the movement of the movement portion in the first direction with respect to the fixing portion can be realized, and a defined rigidity can be ensured.

In the head module support mechanism according to another aspect, the guide portion may include a plurality of the rolling guides, and a total length of the rolling guide in the first direction may be shorter than a total length of the fixing portion in the first direction.

According to such an aspect, the plurality of rolling guides can be disposed in a distributed manner.

In the head module support mechanism according to another aspect, a direction that is orthogonal to the first direction and in which the fixing portion and the movement portion are arranged may be defined as a second direction, and a direction orthogonal to each of the first direction and the second direction may be defined as a third direction, and the plurality of rolling guides may be disposed in a distributed manner in the first direction and the third direction.

According to such an aspect, accessing the fixing portion and the movement portion from the outside is facilitated.

In the head module support mechanism according to another aspect, the plurality of rolling guides may be respectively disposed at end portions in the first direction and end portions in the third direction.

According to such an aspect, it is possible to realize a good distributed disposition of the plurality of rolling guides in which the defined position accuracy and the defined rigidity can be ensured.

In the head module support mechanism according to another aspect, the guide portion may include the plurality of rolling guides, and the total length of the rolling guide in the first direction may correspond to the total length of the fixing portion in the first direction.

In such an aspect, the plurality of rolling guides may be provided.

In the head module support mechanism according to another aspect, a direction orthogonal to a second direction, which is orthogonal to the first direction and in which the fixing portion and the movement portion are arranged, may be defined as a third direction, and the plurality of rolling guides may be respectively disposed at end portions in the third direction.

According to such an aspect, it is possible to ensure the defined position accuracy and the defined rigidity, and it is possible to access the internal portion from the first direction.

In the head module support mechanism according to another aspect, the rolling guide may include a first guide member, a second guide member, and a rolling structure, and may have a structure in which the rolling structure is interposed between a first groove formed in the first guide member and a second groove formed in the second guide member, and the first guide member and the second guide member may be subjected to a hardening treatment on surfaces thereof.

According to such an aspect, it is possible to suppress the deformation of the surface of the first guide member and the deformation of the surface of the second guide member in a case in which a pressure is applied between the first guide member and the second guide member.

In such an aspect, a pressure adjustment mechanism that adjusts the pressure applied between the first guide member and the second guide member may be provided. In a case in which the plurality of rolling guides are provided, the pressure adjustment mechanism may be provided for each rolling guide.

In the head module support mechanism according to another aspect, a radical nitriding treatment may be applied to the hardening treatment.

According to such an aspect, it is possible to suppress a change in surface roughness of the first guide member and the second guide member that have undergone the hardening treatment.

The head module support mechanism according to another aspect, may further comprise: a position detection unit that detects a position of the movement portion in the first direction with respect to the fixing portion.

According to such an aspect, it is possible to understand the position of the head module joined to the movement portion in the first direction with respect to the fixing portion in a case of moving the head module joined to the movement portion in the first direction with respect to the fixing portion. As a result, the efficiency in a case of adjusting the position of the head module in the first direction can be improved.

In the head module support mechanism according to another aspect, the first direction movement portion may include a cam member, a contact member that abuts on the cam member and moves in the first direction in response to rotation of the cam member, and a biasing force applying member that applies a biasing force in a direction in which the contact member abuts on the cam member to the contact member.

According to such an aspect, an operation of rotating the cam member can be applied to adjust the position of the head module in the first direction.

In the head module support mechanism according to another aspect, a surface treatment of applying a lubricity to at least any one of a surface of the cam member or a surface of the contact member may be performed.

According to such an aspect, the generation of the frictional force between the cam member and the contact member is suppressed. As a result, it is possible to suppress a decrease in the accuracy in the position adjustment of the head module in the first direction.

In the head module support mechanism according to another aspect, a rolling element member may be applied to the contact member.

According to such an aspect, the generation of the frictional force between the cam member and the contact member is suppressed. As a result, it is possible to suppress a decrease in the accuracy in the position adjustment of the head module in the first direction.

The head module support mechanism according to another aspect, may further comprise: a frictional force applying portion that applies a frictional force to a rotation shaft of the cam member.

According to such an aspect, unnecessary operation of the cam member is suppressed. As a result, it is possible to suppress the decrease in the accuracy of the position adjustment of the head module in the first direction due to the unnecessary operation of the cam member.

In the head module support mechanism according to another aspect, the head module may be joined to a module support member, the fixing portion may have a groove structure formed in a surface joined to the module support member, and the module support member may have a projection structure having a shape fitted to the groove structure and formed on a surface joined to the fixing portion.

According to such an aspect, the defined position accuracy in the joining between the fixing portion and the module support member can be ensured.

In the head module support mechanism according to another aspect, the module support member may include a first member to which the head module is joined, and a second member in which the projection structure is formed, and the module support member may have a structure in which the first member and the second member are orthogonal to each other.

According to such an aspect, it is possible to realize the module support member having a structure capable of achieving both the joining of the head module and the joining of the fixing portion.

A liquid jet head according to an aspect of the present disclosure comprises: one or more head modules; a module support mechanism that supports the head module; and a frame, in which the module support mechanism includes a fixing portion that is joined to the frame, a movement portion that supports the head module and is supported to be movable in a first direction with respect to the fixing portion, a first direction movement portion that moves the movement portion that supports the head module in the first direction with respect to the fixing portion, and a guide portion that guides the movement portion with respect to the fixing portion and to which a rolling guide extending in the first direction is applied.

With the liquid jet head according to the aspect of the present disclosure, it is possible to obtain the same effects as those of the head module support mechanism according to the aspect of the present disclosure. The configuration requirements of the head module support mechanism according to another aspect can be applied to the configuration requirements of the liquid jet head according to another aspect.

The liquid jet head according to another aspect, may further comprise: a plurality of the head modules, in which the liquid jet head has a structure in which the plurality of head modules are arranged in the first direction.

In such an aspect, the plurality of head modules may be arranged in a row in the first direction, or the plurality of head modules may be arranged in the first direction by applying a zigzag disposition of two rows.

A liquid jet system according to an aspect of the present disclosure comprises: a liquid jet head, in which the liquid jet head includes one or more head modules, and a module support mechanism that supports the head module, and the module support mechanism includes a fixing portion that is joined to a frame of the liquid jet head, a movement portion that supports the head module and is supported to be movable in a first direction with respect to the fixing portion, a first direction movement portion that moves the movement portion that supports the head module in the first direction with respect to the fixing portion, and a guide portion that guides the movement portion with respect to the fixing portion and to which a rolling guide extending in the first direction is applied.

With the liquid jet system according to the aspect of the present disclosure, it is possible to obtain the same effects as those of the head module support mechanism according to the aspect of the present disclosure. The configuration requirements of the head module support mechanism according to another aspect can be applied to the configuration requirements of the liquid jet system according to another aspect.

In the liquid jet system according to another aspect, a direction that is orthogonal to the first direction and in which the fixing portion and the movement portion are arranged may be defined as a second direction, and the liquid jet system may further comprise a relative movement device that moves a substrate to which a liquid jetted from the liquid jet head adheres and the liquid jet head relative to each other in the second direction.

According to such an aspect, in the liquid jet system in which the substrate and the liquid jet head are moved relative to each other in the second direction, the position of the head module can be adjusted in the direction orthogonal to the direction of the relative movement between the substrate and the liquid jet head and parallel to a transport surface of the substrate.

According to the aspect of the present invention, the rolling guide extending in the first direction is applied to the guide portion that guides the movement portion with respect to the fixing portion. As a result, the defined position accuracy in the movement of the movement portion in the first direction with respect to the fixing portion can be realized, and a defined rigidity can be ensured.

DESCRIPTION OF THE PREFERRED EMBODIMENTS

Figure 1:
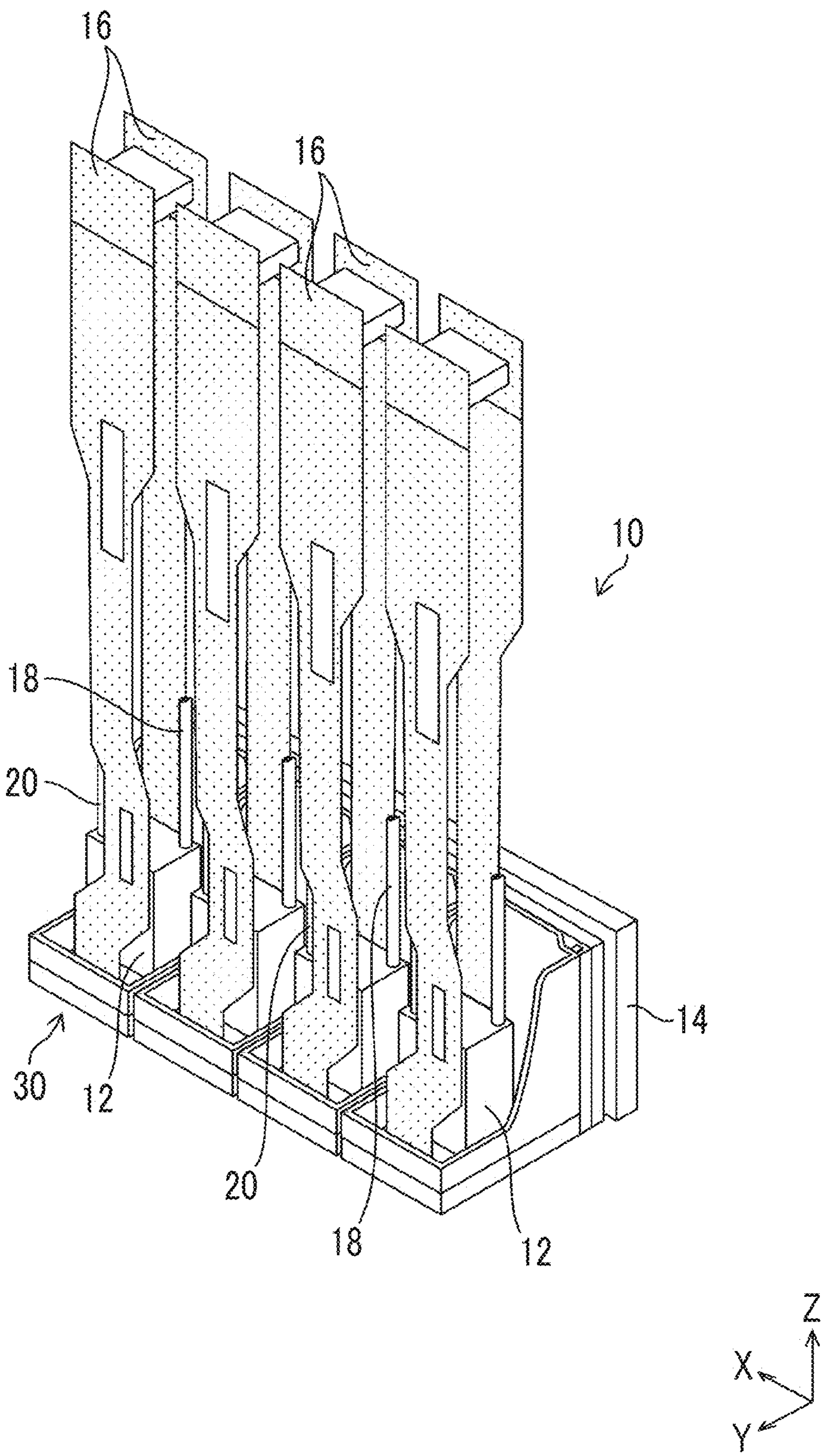
FIG. 1 is a perspective view showing an overall configuration of a liquid jet head according to an embodiment.

Hereinafter, the detailed description of preferred embodiments of the present invention will be made with reference to the accompanying drawings. In the present specification, the same reference numeral will be given to the same configuration element and the duplicate description thereof will be omitted as appropriate.

[Configuration Example of Liquid Jet Head According to Embodiment]

Figure 2:
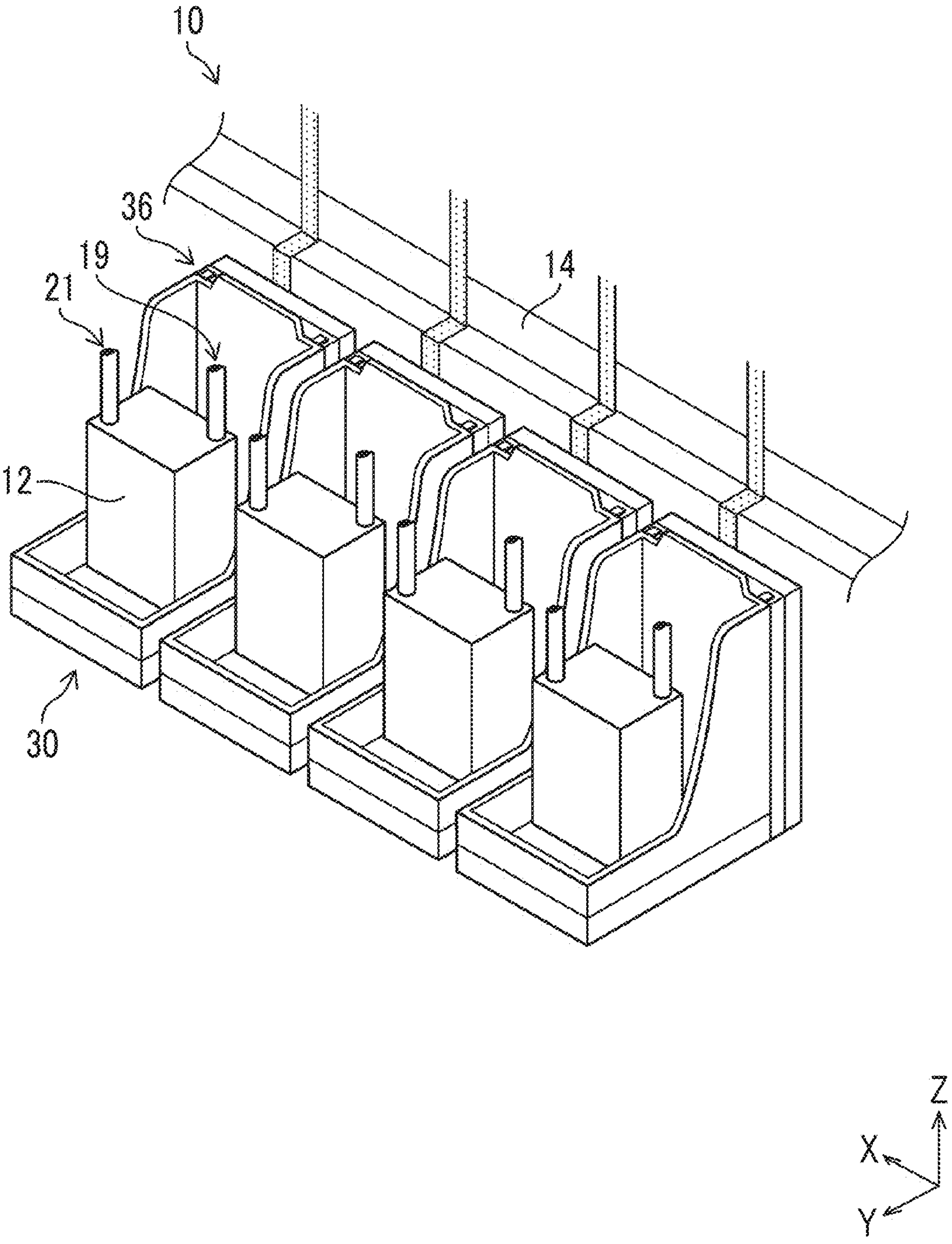
FIG. 2 is a perspective view showing a state in which a part of a bar frame of the liquid jet head shown in FIG. 1 is removed.

FIG. 1 is a perspective view showing an overall configuration of a liquid jet head according to the embodiment. FIG. 2 is a perspective view showing a state in which a part of a bar frame of the liquid jet head shown in FIG. 1 is removed. A liquid jet head 10 shown in FIG. 1 and FIG. 2 is a liquid jet head using an ink jet method, and has a structure in which a plurality of head modules 12 are connected to each other in a longitudinal direction.

The plurality of head modules 12 are integrally supported by using a bar frame 14. The liquid jet head 10 comprises an X moving mechanism that moves each head module 12 in the longitudinal direction to adjust the position thereof in the same direction. The X moving mechanism is denoted by reference numeral 240 and shown in FIG. 14.

FIGS. 1 and 2 show the liquid jet head 10 comprising the plurality of head modules 12, but one or more head modules 12 provided in the liquid jet head 10 can be applied. In addition, in FIG. 1, a structure is shown in which the plurality of head modules 12 are arranged in one row in the longitudinal direction of the liquid jet head 10, but the disposition of the plurality of head modules 12 may be applied with the zigzag disposition of two rows or the like.

The flexible substrate 16 is attached to each head module 12. The flexible substrate is provided with an electric wiring line for transmitting a drive voltage supplied to a piezoelectric element provided inside the head module 12.

A supply flow channel tube 18 and a circulation flow channel tube 20 are attached to each head module 12. The supply flow channel tube 18 is connected to an ink supply port 19 of the head module 12. The circulation flow channel tube 20 is connected to an ink circulation port 21 of the head module 12. It should be noted that, in FIG. 2, the supply flow channel tube 18 and the circulation flow channel tube 20 are not shown.

Each of the plurality of head modules 12 is supported by using a module mount 30. The module mount 30 is joined to the bar frame 14 via a clamp assembly 36.

Here, for the liquid jet head 10, an X direction, a Y direction, and a Z direction are defined. The X direction is an arrangement direction of the head modules 12 and the longitudinal direction of the liquid jet head 10. The Y direction is a direction orthogonal to the X direction and parallel to a nozzle surface of the head module 12. The Z direction is a direction orthogonal to the X direction and the Y direction.

It should be noted that the X direction shown in the embodiment is an example of a first direction. The Y direction shown in the embodiment is an example of a second direction. The Z direction shown in the embodiment is an example of a third direction.

In a state in which the liquid jet head 10 is mounted on an ink jet printing system, the X direction corresponds to a substrate width direction orthogonal to a substrate transport direction, and the Y direction corresponds to a substrate transport direction. Also, in a case of representing three directions corresponding to a length, a width, and a height of the head module 12, the X direction, the Y direction, and the Z direction are used.

It should be noted that the term "parallel" may include substantial parallelism that can be regarded as parallelism even in a case in which the two directions of the target are not strictly parallel. Similarly, the term "orthogonal" may include substantial orthogonality that can be considered as orthogonality even in a case in which the two directions of the target form an angle of less than 90° or more than 90°.

Figure 3:
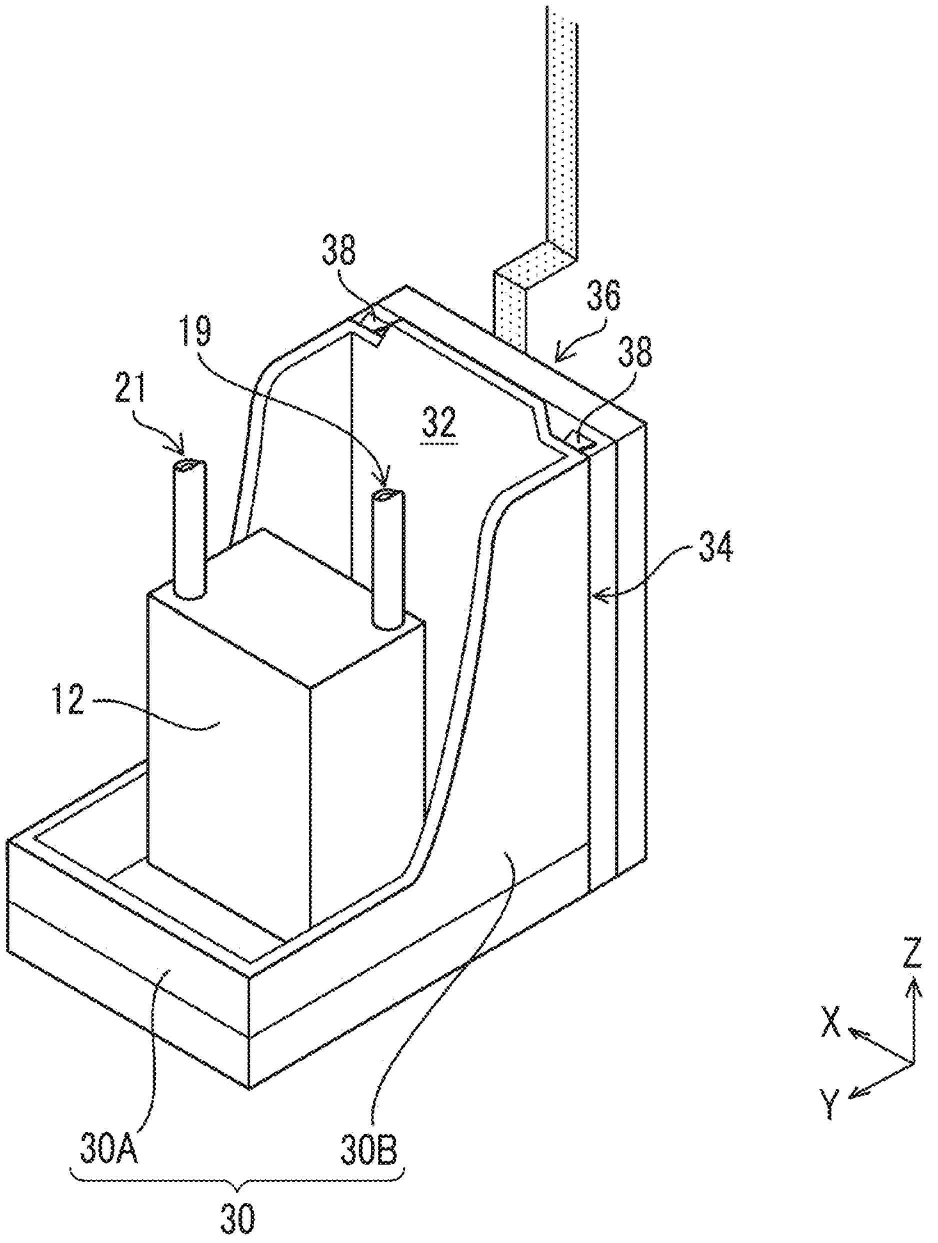
FIG. 3 is a perspective view showing an example of a support structure of a head module.

FIG. 3 is a perspective view showing an example of a support structure of the head module. The head module 12 is joined to a bottom surface portion 30A of the module mount 30. A through-hole is formed in the bottom surface portion 30A of the module mount 30, and the registration between the nozzle surface of the head module 12 and the through-hole is performed.

An aspect is applied in which an adhesive member such as an adhesive is used to join the head module 12 and the bottom surface portion 30A of the module mount 30 to each other. It should be noted that the through-hole formed in the bottom surface portion 30A is not shown. In addition, the nozzle surface of the head module 12 is denoted by reference numeral 432 and shown in FIG. 23.

The clamp assembly 36 is attached to a rear surface portion 30B of the module mount 30 on a surface 34 on a side opposite to a surface 32 to which the head module 12 is attached. A projection structure 38 is formed on the surface 34 of the module mount 30. The projection structure 38 has a shape that can be fitted to a groove structure of the clamp assembly 36.

Figure 4:
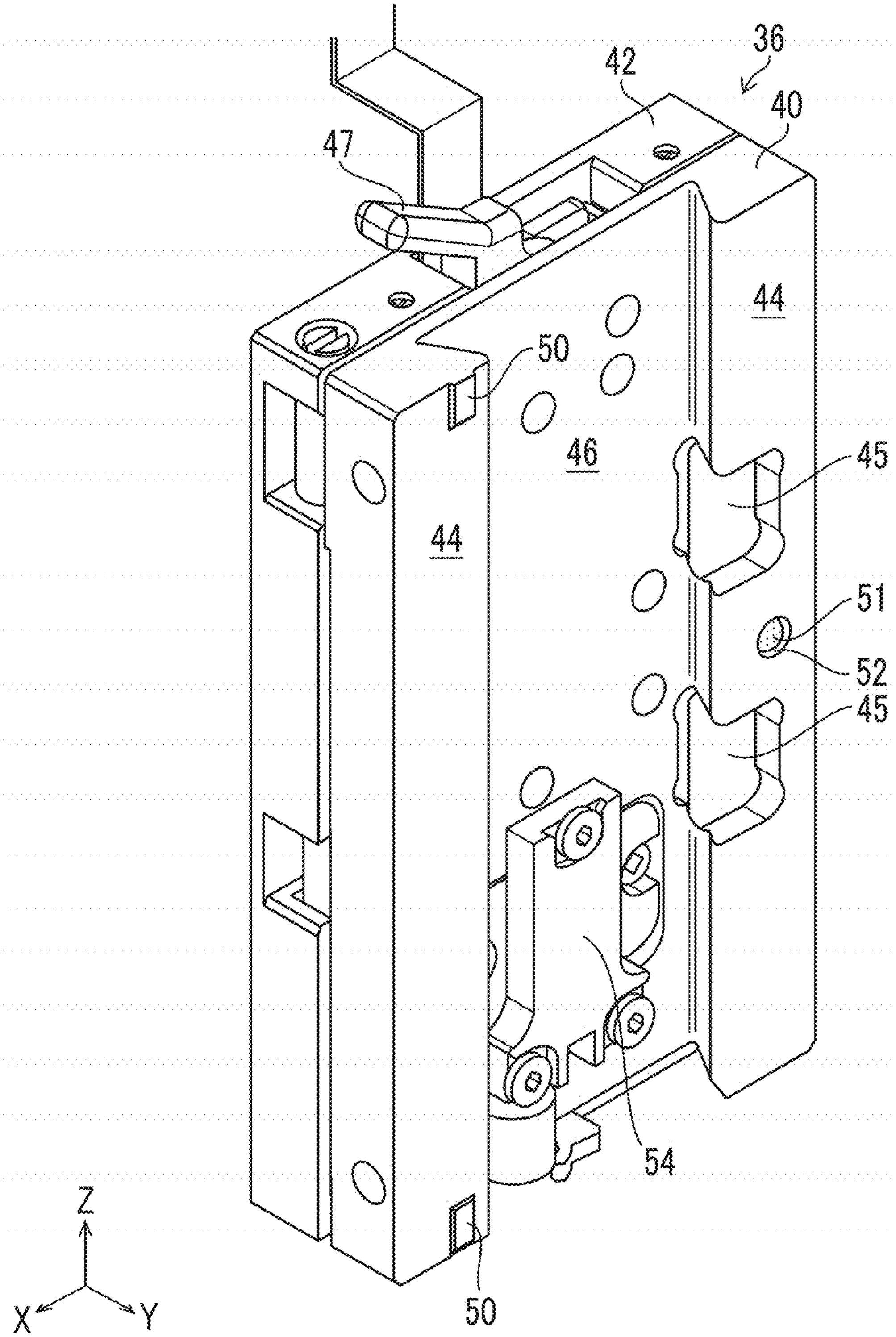
FIG. 4 is a perspective view of a clamp assembly shown in FIG. 3.

It should be noted that the groove structure of the clamp assembly 36 is denoted by reference numeral 46 and shown in FIG. 4. The module mount 30 described in the embodiment is an example of a module support member. The projection structure 38 having a shape that can be fitted to the groove structure of the clamp assembly 36 described in the embodiment is an example of a projection structure having a shape fitted to the groove structure.

The module mount 30 described in the embodiment is an example of a module support member having a structure in which the first member and the second member are orthogonal to each other. The bottom surface portion 30A described in the embodiment is an example of a first member to which the head module is joined. The rear surface portion 30B described in the embodiment is an example of a second member in which a projection structure is formed.

FIG. 4 is a perspective view of the clamp assembly shown in FIG. 3. The clamp assembly 36 comprises a movement portion 40 and a fixing portion 42. In the clamp assembly 36, the movement portion 40 is supported movable in the X direction with respect to the fixing portion 42.

The movement portion 40 forms the groove structure 46 in a surface 44 to which the module mount 30 is attached. The groove structure 46 has a structure that can be fitted to the projection structure 38 of the module mount 30. The groove structure 46 provided in the module mount 30 can be a structure referred to as a dovetail groove.

From an upper side in the Z direction shown in FIG. 4, the projection structure 38 of the module mount 30 is inserted into the groove structure 46, and the bottom surface portion 30A of the module mount 30 abuts on a Z reference 80. As a result, the registration of the module mount 30 with respect to the clamp assembly 36 in the Z direction is performed.

In a case in which a lever 47 provided in the fixing portion 42 is operated in a state in which the registration of the module mount 30 in the Z direction, a clamp claw disposed in a hole 45 formed in the movement portion 40 presses the projection structure 38 of the module mount 30 in the X direction.

The projection structure 38 of the module mount 30 abuts on an X reference. As a result, the registration of the module mount 30 with respect to the clamp assembly 36 in the X direction is performed, and the module mount 30 is fixed to the clamp assembly 36. It should be noted that, in FIG. 4, the clamp claw disposed in the hole 45 and the X reference are not shown. The clamp claw is denoted by reference numeral 86 and shown in FIG. 5. The X reference is denoted by reference numeral 60 and shown in FIG. 5.

The surface 44 of the movement portion 40 comprises two Y references 50 and one Y reference 51. The Y reference 50 and the Y reference 51 function as a reference position of the module mount 30 in the Y direction with respect to the clamp assembly 36.

A spherical structure is applied to the Y reference 51. A rolling structure, such as a roller, may be applied to the Y reference 51. The Y reference 51 is inserted into a hole 52 and is supported such that the position in the Y direction is movable inside the hole 52. The Y reference 51 can move the position in the Y direction by rotating a Y reference movement screw. The Y reference movement screw is denoted by reference numeral 70 and shown in FIG. 5.

The position of the Y reference 51 in the Y direction is moved to adjust an amount by which the Y reference 51 protrudes from the surface 44, and a posture of the module mount 30 with respect to a rotation axis extending in the Z direction is adjusted.

A magnet holder 54 is attached to the movement portion 40. A permanent magnet is built in the magnet holder 54. The permanent magnet functions as a component of a position detection sensor that detects the position of the head module 12 in the X direction. In FIG. 4, the permanent magnet is not shown. The permanent magnet is denoted by reference numeral 214 and shown in FIG. 13.

Figure 5:
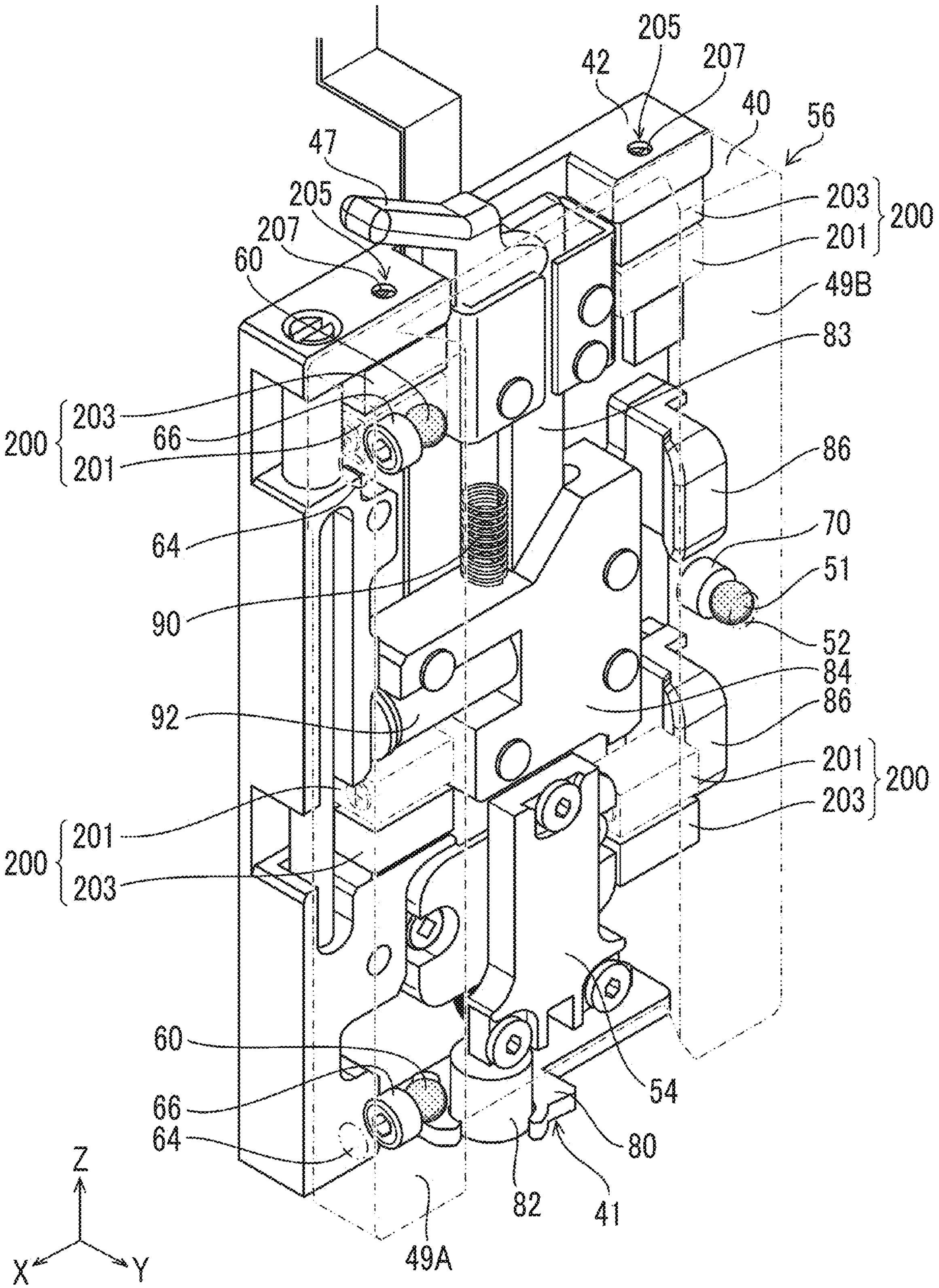
FIG. 5 is a perspective view showing a body of a movement portion shown in FIG. 4 in a transparent manner.

FIG. 5 is a perspective view showing a body of the movement portion shown in FIG. 4 in a transparent manner. FIG. 5 shows a state in which a body 56 of the movement portion 40 shown in FIG. 4 is made transparent and an internal structure of the movement portion 40 is visualized. It should be noted that, in FIG. 5, the transparent body 56 is shown by a two-dot chain line.

The movement portion 40 comprises two X references 60. The two X references 60 are disposed at different positions in the Z direction. The same configuration can be applied to the two X references 60.

The X reference 60 functions as a reference position of the module mount 30 in the X direction with respect to the clamp assembly 36. A spherical structure is applied to the X reference 60. A rolling structure, such as a roller, may be applied to the X reference 60. The X reference 60 is disposed inside a hole 64 that penetrates a beam portion 49A in the X direction, and is supported to be movable inside the hole 64. The X reference 60 is adjusted in an amount of protrusion from the beam portion 49A by using an X reference movement screw 66.

The hole 52 in which the Y reference 51 is disposed is formed in the beam portion 49B of the body 56. The hole 52 has a structure for penetrating the movement portion 40. The Y reference movement screw 70 that moves the position of the Y reference 51 in the Y direction is inserted into the hole 52.

The Z reference 80 and a Z direction magnet 82 are provided on a bottom surface 41 of the movement portion 40. The Z reference 80 functions as a reference position in the Z direction in a case in which the module mount 30 is attached to the clamp assembly 36. The Z direction magnet 82 applies a biasing force upward in the Z direction to the module mount 30 in a case in which the module mount 30 is attached to the clamp assembly 36.

Figure 6:
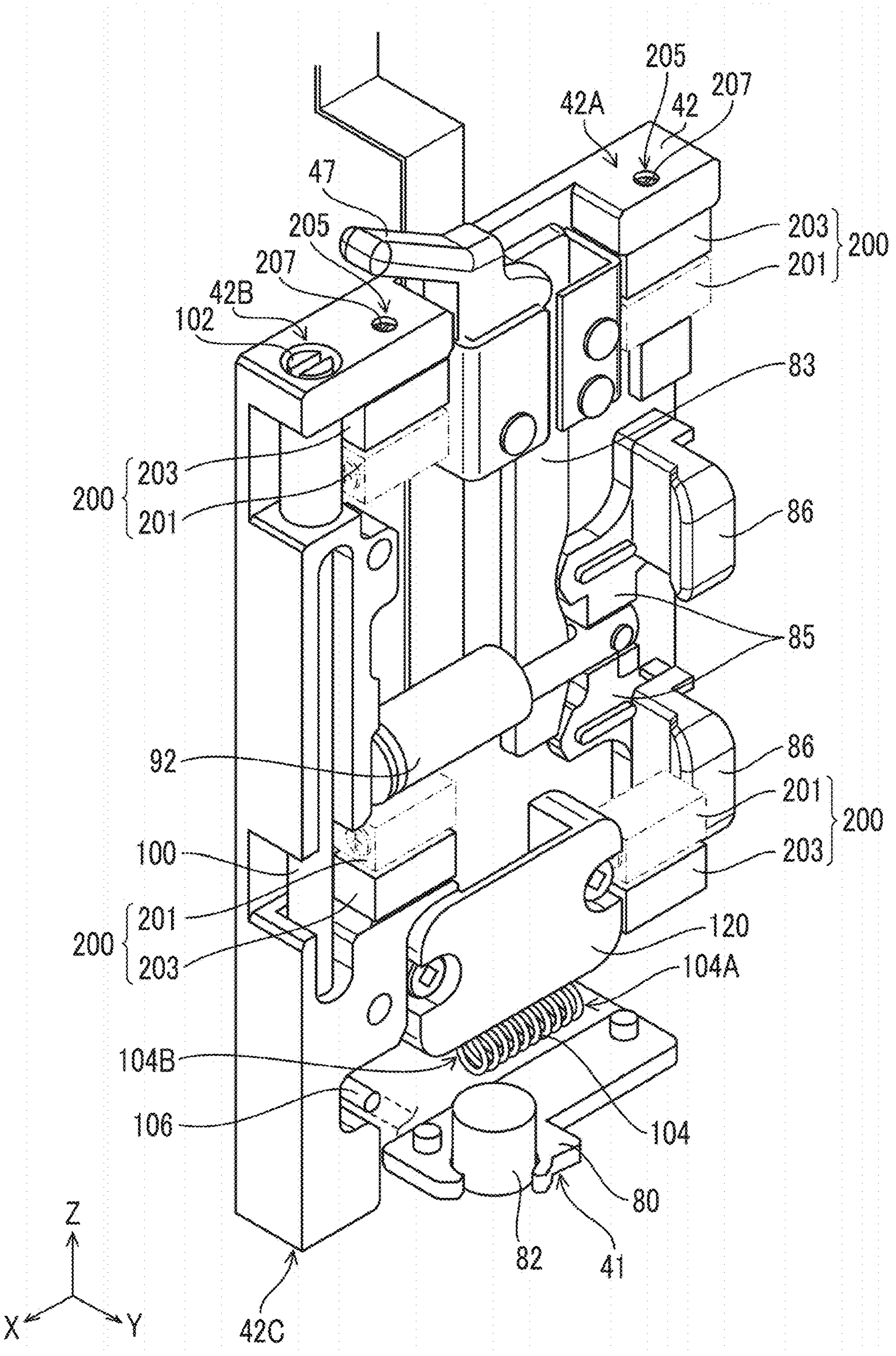
FIG. 6 is a perspective view showing a state in which a plate cam guide and the like shown in FIG. 5 are removed.
Figure 7:
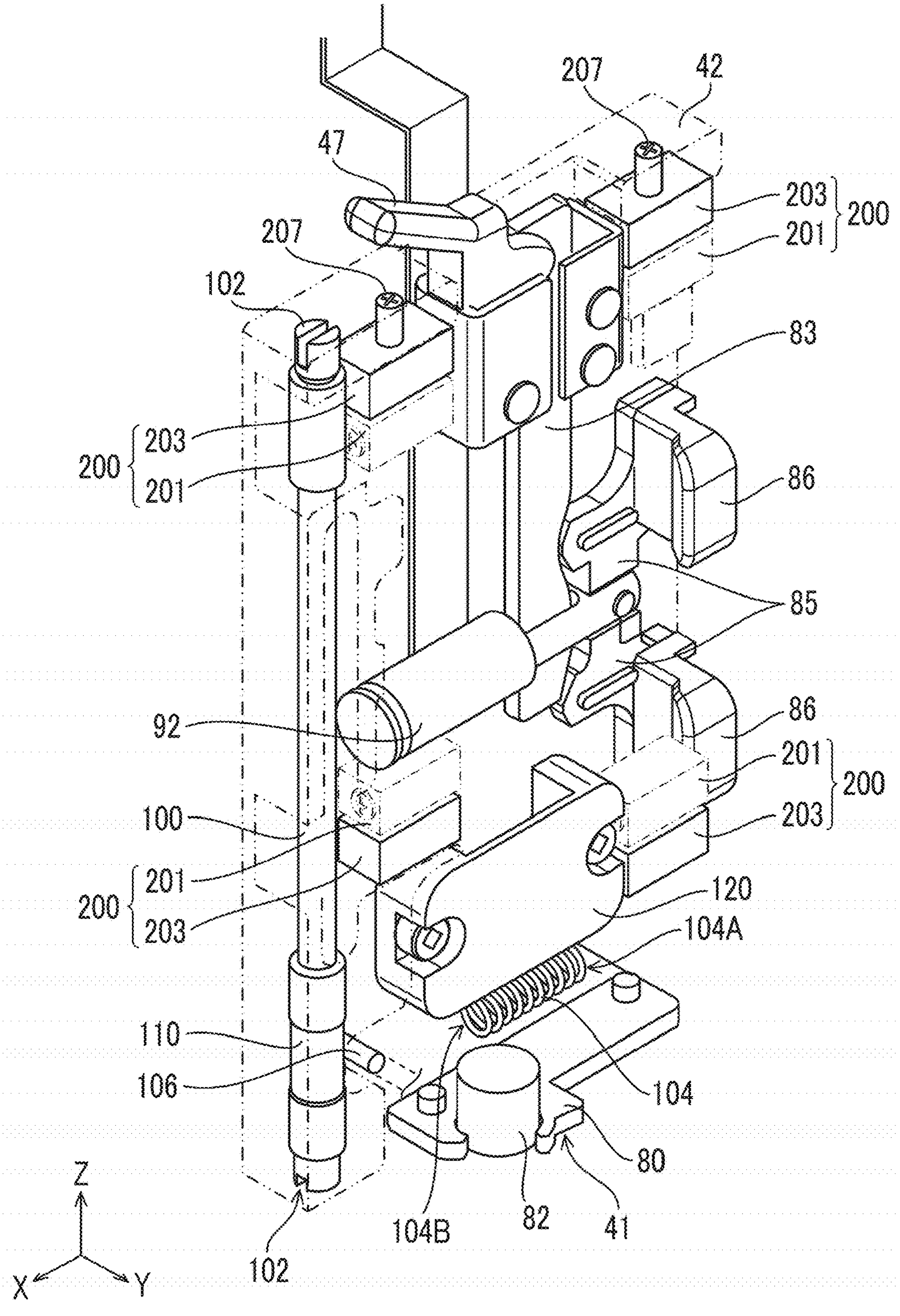
FIG. 7 is a perspective view showing a state in which a body frame of a fixing portion shown in FIG. 6 is removed.
Figure 8:
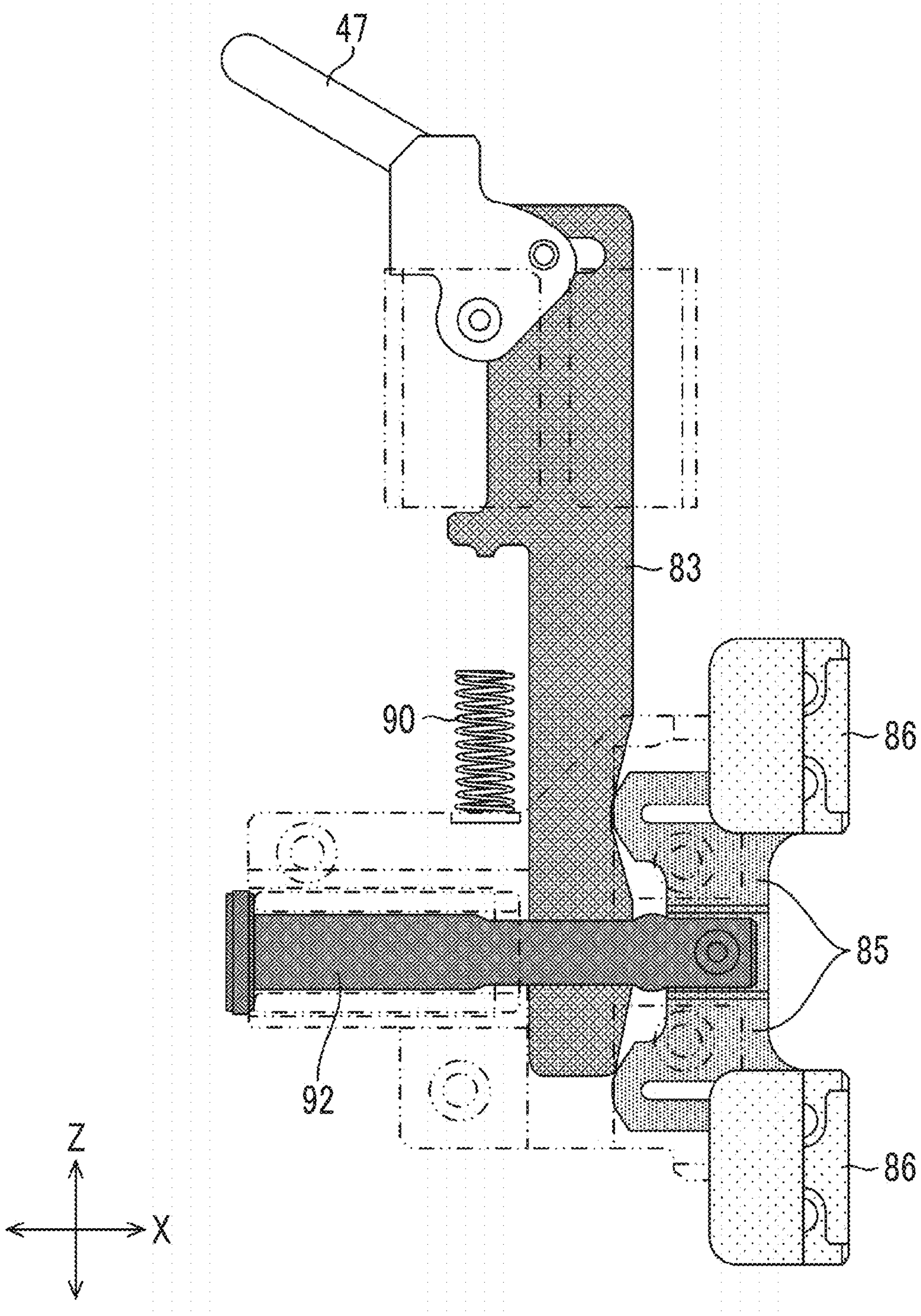
FIG. 8 is a front view showing a structural example of the periphery of the plate cam, and is a view showing a state in which a module mount is released from the clamp assembly.

The inside of the movement portion 40 is provided with a plate cam 83. The plate cam 83 is supported by using a plate cam guide 84. The plate cam 83 is coupled to the lever 47 and reciprocates in the Z direction in response to the operation of the lever 47. The coupling structure between the plate cam 83 and the lever 47 is shown in FIGS. 6 to 8.

One end of a plate cam return spring 90 is joined to the plate cam guide 84. The other end of the plate cam return spring 90 is joined to the plate cam 83. The plate cam return spring 90 applies a biasing force upward in the Z direction in a case in which the plate cam 83 is moved in an upward direction. FIG. 5 shows a non-compression plate cam return spring 90.

The inside of the movement portion 40 is provided with a holding claw 86. The holding claw 86 is coupled to the plate cam 83 via a plate cam arm, and reciprocates in the X direction in response to the reciprocation of the plate cam 83 in the Z direction. The holding claw 86 is applied with the biasing force directed to the inner side of the movement portion 40 in the X direction by using a clamp spring 92. It should be noted that the plate cam arm is denoted by reference numeral 85 and shown in FIG. 6.

The holding claw 86 supports the projection structure 38 of the module mount 30 attached to the groove structure 46. The fixing and the release of the module mount 30 with respect to the clamp assembly 36 are switched in response to the reciprocation of the holding claw 86 in the X direction.

The movement portion 40 comprises a first guide member 201 constituting a guide 200. The movement portion 40 disposes the first guide members 201 at four locations. The first guide member 201 has a first groove formed in a surface facing a second guide member 203 provided in the fixing portion 42. A spherical structure is disposed in the first groove. A defined pressure is applied between the first guide member 201 and the second guide member 203 by using a pressure adjustment screw. It should be noted that, in FIG. 5, the first groove and the spherical structure are not shown. The first groove is denoted by reference numeral 202 and shown in FIG. 10. The spherical structure is denoted by reference numeral 206 and shown in FIG. 10.

FIG. 6 is a perspective view showing a state in which the plate cam guide and the like shown in FIG. 5 are removed. The fixing portion 42 comprises a cam shaft 100. The cam shaft 100 has a length that penetrates the fixing portion 42 from the upper surface to the lower surface, and is disposed inside the fixing portion 42 and is rotatably supported.

Grooves 102 are formed at both ends of the cam shaft 100 in the Z direction. The groove 102 is exposed from an opening 42B formed in an upper surface 42A of the fixing portion 42. An opening is also formed in a lower surface 42C of the fixing portion 42, and the groove formed at the other end of the cam shaft 100 is exposed from the opening. It should be noted that the opening formed in the lower surface 42C of the fixing portion 42 and the groove formed at the other end of the cam shaft 100 are not shown.

The cam shaft 100 supports an eccentric cam. The eccentric cam rotates in response to the rotation of the cam shaft 100. It should be noted that the eccentric cam is denoted by reference numeral 110 and shown in FIG. 7. The cam shaft 100 and the eccentric cam are components of the X moving mechanism that moves the head module 12 in the X direction.

The fixing portion 42 comprises an X movement spring 104 that constitutes the X moving mechanism. The X movement spring 104 has one end 104A fixed to the fixing portion 42, and the other end 104B fixed to the movement portion 40. It should be noted that, in FIG. 6, a structure for fixing the X movement spring 104 is not shown. The structure for fixing the X movement spring 104 will be described in detail with reference to FIG. 14.

The fixing portion 42 is provided with a sensor holder 120. A Hall element is built in the sensor holder 120. The Hall element is denoted by reference numeral 212 and shown in FIG. 13. The Hall element functions as a component of the position detection sensor that detects the position of the head module 12 in the X direction.

Figure 14:
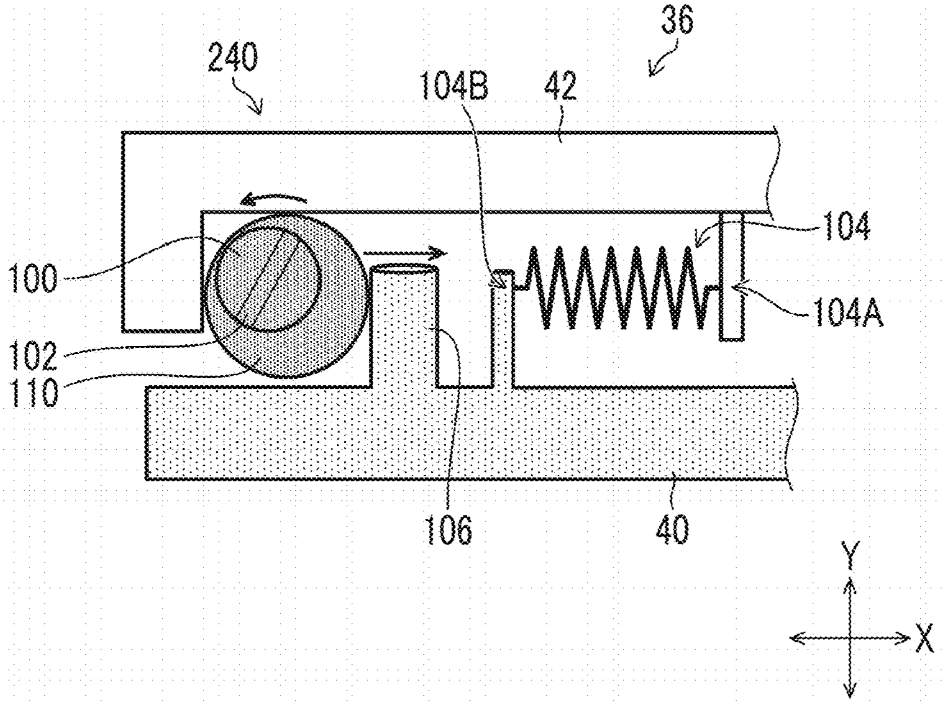
FIG. 14 is a schematic view showing a configuration example of an X moving mechanism.

In FIG. 6, a support structure of the one end 104A and a support structure of the other end 104B of the X movement spring 104 are not shown. The support structure of the one end 104A and the support structure of the other end 104B of the X movement spring 104 are shown in FIG. 14.

FIG. 6 shows a cam contact member 106 provided in the movement portion 40. The cam contact member 106 abuts on the eccentric cam and reciprocates in the X direction in response to the rotation of the eccentric cam. The movement portion 40 reciprocates in the X direction with respect to the fixing portion 42 in response to the reciprocation of the cam contact member 106 in the X direction. The X movement spring 104 applies a biasing force in a direction of pressing the cam contact member 106 provided in the movement portion 40 against the eccentric cam to the cam contact member 106. It should be noted that the X movement spring 104 described in the embodiment is an example of a biasing force applying member.

The fixing portion 42 comprises a second guide member 203 constituting the guide 200. The second guide member 203 has a second groove formed in a surface facing the first guide member 201 provided in the movement portion 40. It should be noted that, in FIG. 6, the second groove is not shown. The second groove is denoted by reference numeral 204 and shown in FIG. 10.

The fixing portion 42 has a through-hole 205 formed in the upper surface on which the lever 47 protrudes. The through-hole 205 is formed as a female screw corresponding to a pressure adjustment screw 207, which is a male screw. The pressure adjustment screw 207 is inserted into the through-hole 205. A pressure corresponding to the pressing amount of the pressure adjustment screw 207 is applied between the first guide member 201 and the second guide member 203. The through-hole 205 and the pressure adjustment screw 207 function as the pressure adjustment mechanism.

FIG. 7 is a perspective view showing a state of the fixing portion in which a body frame of the fixing portion shown in FIG. 6 is removed. FIG. 7 shows the eccentric cam 110 rotatably supported by using the cam shaft 100. Details of the X moving mechanism will be described below.

FIG. 8 is a front view showing a structural example of the periphery of the plate cam, and is a view showing a state in which the module mount is released from the clamp assembly. FIG. 8 shows the plate cam 83 and a peripheral member of the plate cam 83 in the same state as in FIGS. 5 to 7.

Figure 9:
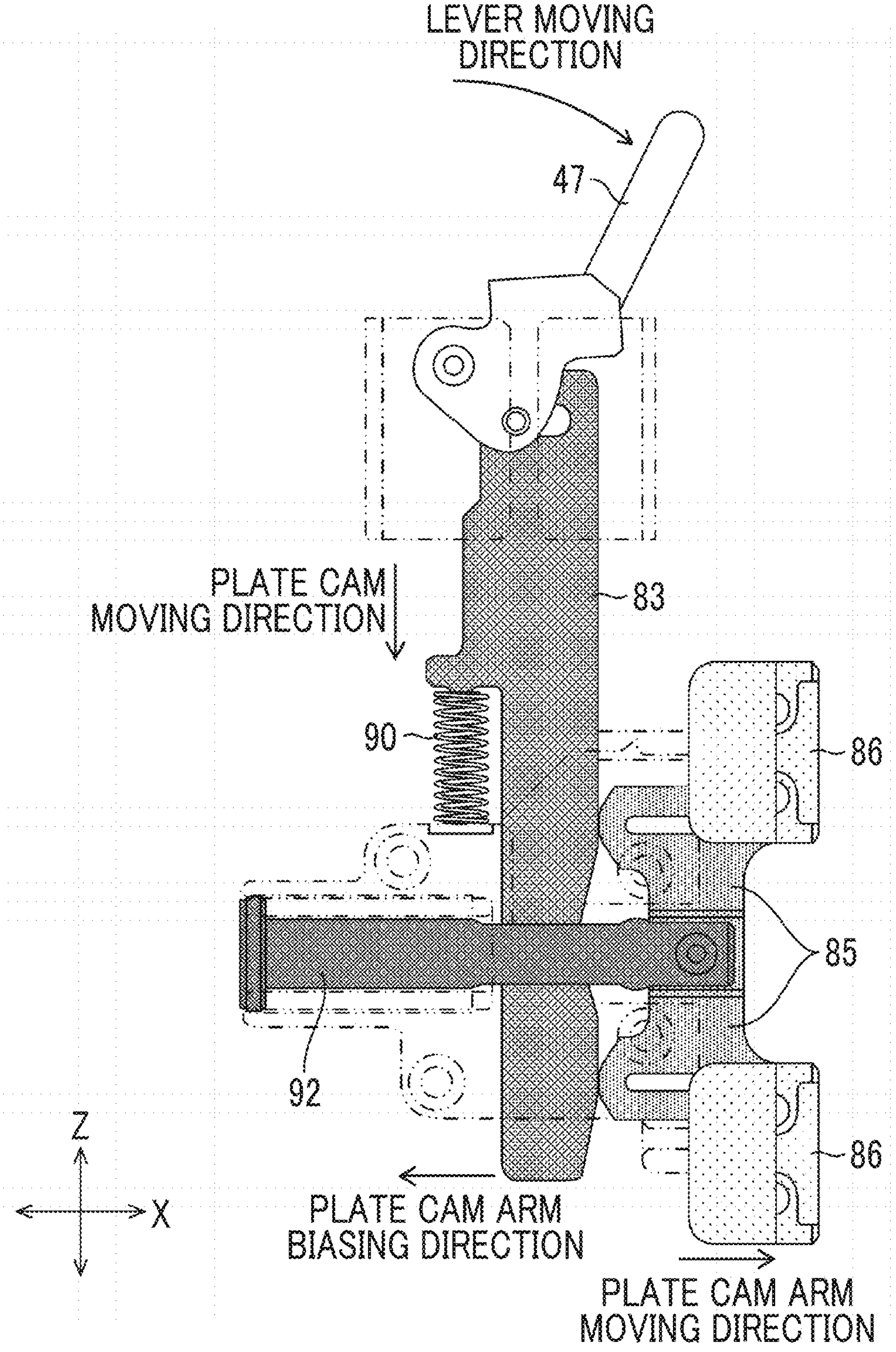
FIG. 9 is a front view showing a structural example of the periphery of the plate cam, and is a view showing a state in which the module mount is fixed to the clamp assembly.

FIG. 9 is a front view showing a structural example of the periphery of the plate cam, and is a view showing a state in which the clamp assembly is fixed to the module mount. In a case in which the lever 47 is operated from the position shown in FIG. 8 to the position shown in FIG. 9, the plate cam 83 moves in a plate cam moving direction along the Z direction.

The plate cam arm 85 moves in a plate cam arm moving direction along the X direction in response to the movement of the plate cam 83 in the plate cam moving direction. In addition, the plate cam arm 85 is provided with a biasing force directed in a plate cam arm biasing direction along the X direction from the clamp spring 92.

In the state shown in FIG. 9, in a case in which the module mount 30 shown in FIG. 3 is held by the holding claw 86, the module mount 30 is biased toward the X reference 60 shown in FIG. 5, and the position of the module mount 30 with respect to the clamp assembly 36 in the X direction is fixed.

In the state shown in FIG. 9, the plate cam return spring 90 is compressed by using the plate cam 83, and a biasing force in a direction opposite to the plate cam moving direction shown in FIG. 9 is applied to the plate cam 83 from the plate cam return spring 90. In a case in which the lever 47 is returned from the position shown in FIG. 9 to the position shown in FIG. 8, the plate cam 83 is operated by being applied with the biasing force from the plate cam return spring 90.

[Detailed Description of Clamp Assembly]

[Guide Structure of Movement Portion with Respect to Fixing Portion]

Figure 10:
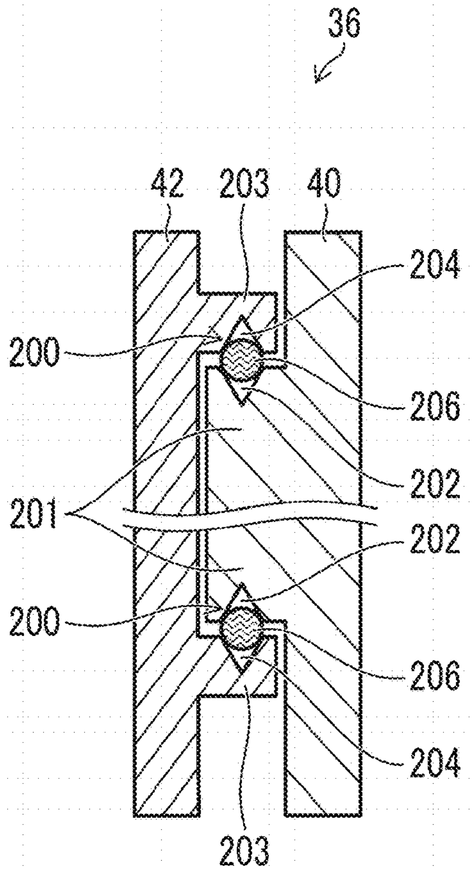
FIG. 10 is a schematic view of the clamp assembly showing a guide structure of the movement portion with respect to the fixing portion.

FIG. 10 is a schematic view of the clamp assembly showing a guide structure of the movement portion with respect to the fixing portion. FIG. 10 is a view showing the clamp assembly 36 as viewed in the X direction, and shows a cross section of the clamp assembly 36 along any YZ plane. It should be noted that, in FIG. 10, the pressure adjustment screw 207 shown in FIG. 5 and the like are not shown.

The clamp assembly 36 is provided with the guide 200 that extends in the X direction as the guide structure of the movement portion 40 with respect to the fixing portion 42 for allowing the movement portion 40 to slide with respect to the fixing portion 42. A rolling guide is applied to the guide 200.

FIG. 10 shows the guide 200 having a structure in which a plurality of spherical structures 206 are interposed between the first groove 202 of the first guide member 201 provided in the movement portion 40 and the second groove 204 of the second guide member 203 provided in the fixing portion 42. A rolling structure, such as one or more rollers, may be used instead of the plurality of spherical structures 206. The guide 200 can adjust a rolling friction coefficient in accordance with the pressure. The pressure applied to the guide 200 is defined in accordance with the position accuracy of the head module 12 in the X direction or the like. The structure of the guide 200 is not limited to the structure in which the spherical structure is interposed between the facing grooves, and any rolling guide can be applied.

A surface pressure caused by the contact with the spherical structure 206 is applied to each of the first groove 202 and the second groove 204. The magnitude of the surface pressure is proportional to the magnitude of the pressure applied between the first groove 202 and the second groove 204, and is proportional to the number of the spherical structures 206. In a case in which the magnitude of the surface pressure exceeds a yield point of the guide 200, the surface of the guide 200 is deformed, which may cause a decrease in the accuracy of the position adjustment of the clamp assembly 36. Therefore, an aspect is preferable in which the surface of the guide 200 is subjected to a hardening treatment.

In a case in which the surface roughness of the first groove 202 and the second groove 204 is relatively large, such as in a case in which the first groove 202 and the second groove 204 have irregularities on the surfaces thereof, the accuracy of the position adjustment of the clamp assembly 36 may decrease. Therefore, it is preferable to perform, as the hardening treatment performed on the surface of the guide 200, a treatment in which the surface roughness of the guide 200 subjected to the surface treatment does not exceed the surface roughness of the guide 200.

In general, a quenching treatment is applied to the hardening treatment. In the quenching treatment, a change in a shape of an object to be treated is relatively large, and polishing is performed as a post-process of the quenching treatment. However, in a case in which the quenching treatment and the polishing are combined, the manufacturing cost may increase.

Therefore, in order to suppress the manufacturing cost, a relatively inexpensive effect treatment such as a nitriding treatment may be applied. In particular, a radical nitriding treatment is a treatment in which a change in a surface roughness is relatively small as compared with other surface treatments, and is useful for suppressing the manufacturing cost.

[Disposition Example of Guide Member]

Figure 11:
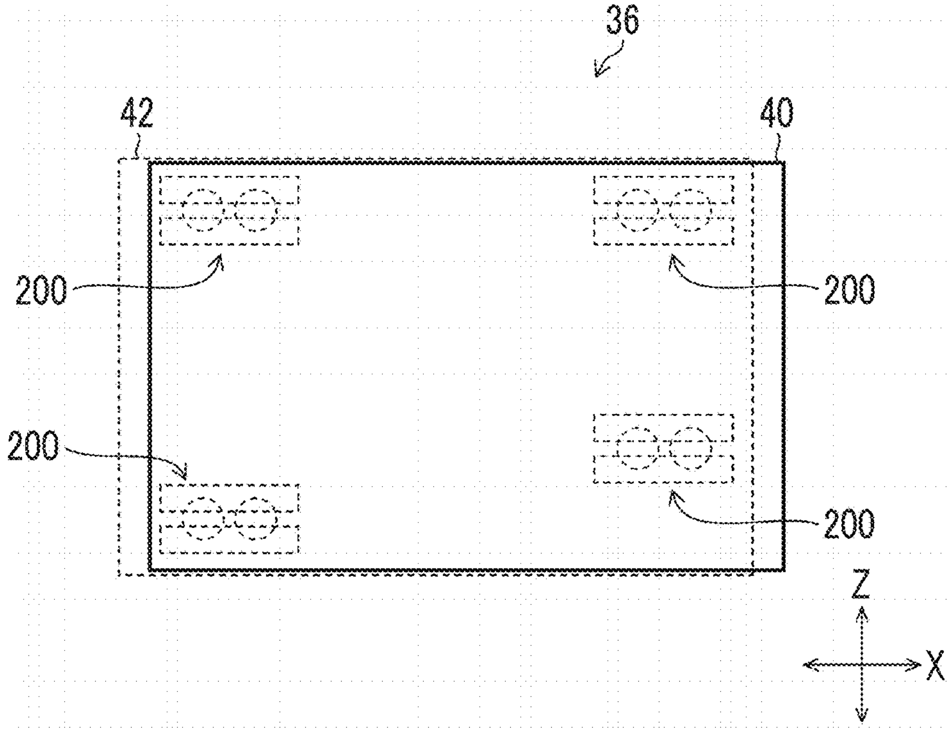
FIG. 11 is a schematic view of the clamp assembly showing a disposition example of a guide member.

FIG. 11 is a schematic view of the clamp assembly showing a disposition example of the guide member. FIG. 11 shows a view of the clamp assembly 36 as viewed from the movement portion 40 side in the Y direction. It should be noted that FIG. 11 schematically shows the guide 200. It should be noted that, for convenience of illustration, the movement portion 40 and the fixing portion 42 are shown to be shifted from each other.

The clamp assembly 36 shown in FIG. 11 comprises four guides 200 having a length shorter than the total length of the clamp assembly 36 in the X direction, and the four guides 200 are disposed in a distributed manner. The four guides 200 are disposed in a direction extending in the X direction.

FIG. 11 shows an aspect in which the guide 200 is disposed at each of four corners of the clamp assembly 36. The two guides 200 arranged in the Z direction have positions in the X direction that match each other. The matching referred herein is not limited to strict matching, and the positions of both in the X direction may be slightly shifted.

In addition, the two guides 200 arranged in the X direction may have positions in the Z direction that match each other or are shifted from each other. In a case in which the plurality of guides 200 are disposed in a distributed manner, it is possible to access the clamp assembly 36 from the X direction and the Y direction.

In addition, in a case in which the guide 200 is disposed at each of the four corners of the clamp assembly 36, a defined position accuracy in the movement of the movement portion 40 with respect to the fixing portion 42 is ensured, and a defined rigidity of the movement portion 40 and the fixing portion 42 is ensured. It should be noted that the guide 200 described in the embodiment is an example of the rolling guide having the total length in the first direction that is shorter than the total length of the fixing portion in the first direction.

Figure 12:
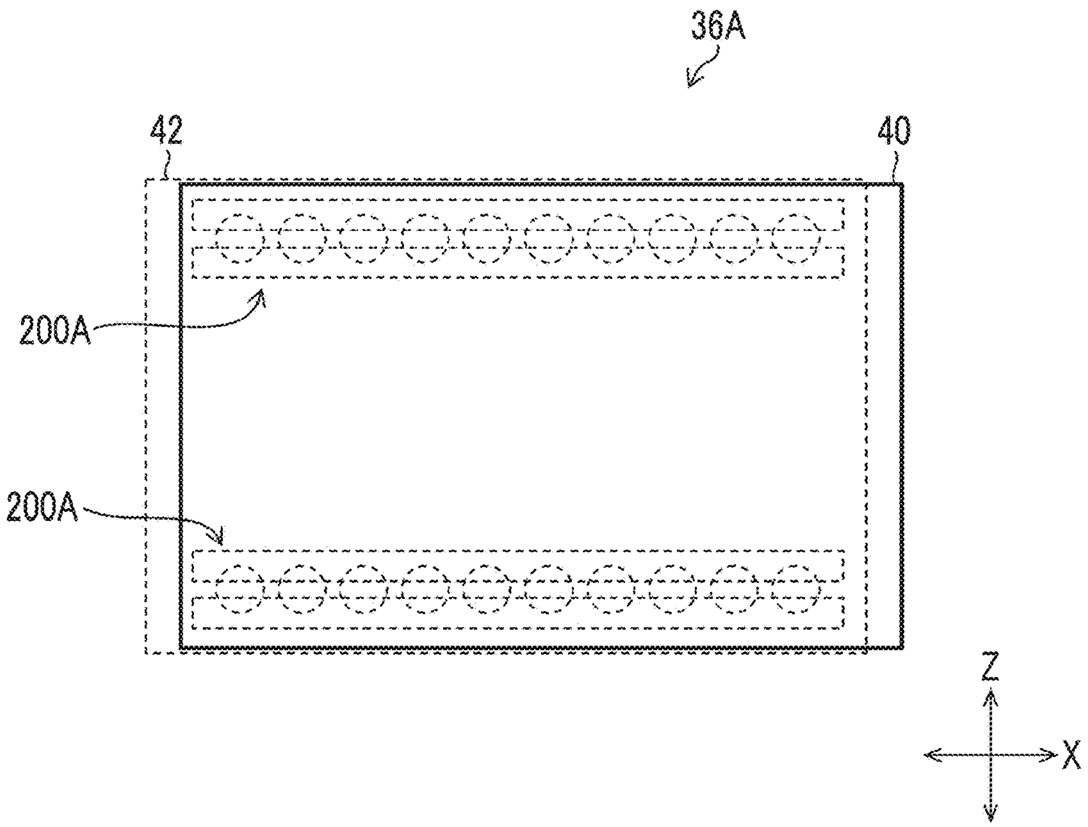
FIG. 12 is a schematic view of the clamp assembly showing another disposition example of the guide member.

FIG. 12 is a schematic view of the clamp assembly showing another disposition example of the guide member. A clamp assembly 36A shown in FIG. 12 comprises a guide 200A having a length corresponding to the total length of the clamp assembly 36A in the X direction. Two guides 200A shown in FIG. 12 are respectively disposed at both ends of the clamp assembly 36A in the Z direction.

The clamp assembly 36A shown in FIG. 12 has an advantage in terms of ensuring the position accuracy and the rigidity with respect to the clamp assembly 36 shown in FIG. 11. On the other hand, the clamp assembly 36A shown in FIG. 12 has a disadvantage in terms of accessing the inside of the clamp assembly 36 from the Z direction with respect to the clamp assembly 36 shown in FIG. 11, but the access from the X direction is possible.

[Disposition Example of Position Detection Sensor]

Figure 13:
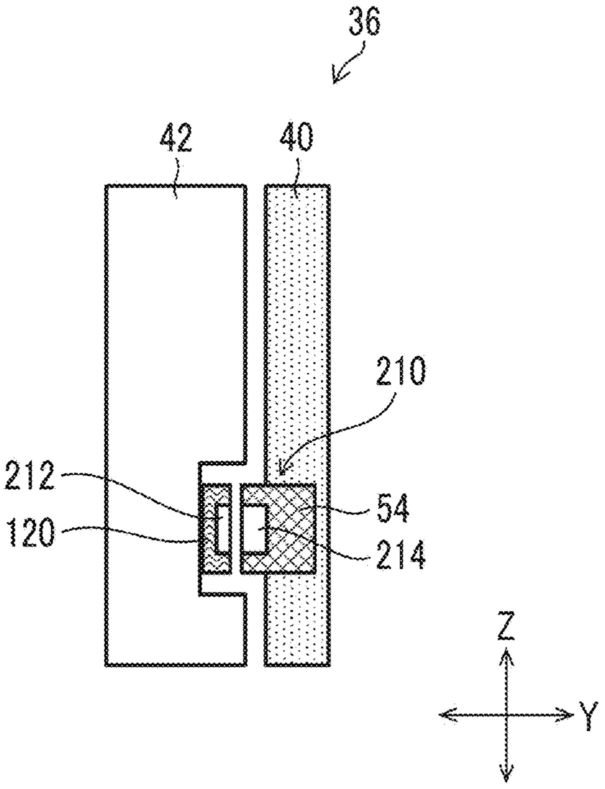
FIG. 13 is a schematic view of the clamp assembly showing a disposition example of a position detection sensor.

FIG. 13 is a schematic view of the clamp assembly showing a disposition example of the position detection sensor. The clamp assembly 36 comprises a position detection sensor 210 that detects the position of the movement portion 40 with respect to the fixing portion 42 in the X direction. The position of the movement portion 40 in the X direction can be understood as the position of the head module 12 in the X direction.

The position detection sensor 210 comprises the Hall element 212 and the permanent magnet 214. The Hall element 212 is disposed in the fixing portion 42. The permanent magnet 214 is disposed in the movement portion 40. A change in the position of the movement portion 40 in the X direction with respect to the fixing portion 42 can be understood based on a detection signal output from the position detection sensor 210. Although a magnetic sensor is shown in FIG. 13, an optical sensor may be applied. In addition, the movement portion 40 may comprise the Hall element 212, and the fixing portion 42 may comprise the permanent magnet 214. It should be noted that the position detection sensor 210 described in the embodiment is an example of a position detection unit.

[X Moving Mechanism]

FIG. 14 is a schematic view showing a configuration example of the X moving mechanism. FIG. 14 is a view showing the clamp assembly 36 in the Z direction from a side of the bottom surface 41 of the clamp assembly 36. The X moving mechanism 240 shown in FIG. 14 comprises the X movement spring 104, the cam contact member 106, and the eccentric cam In a case in which the cam shaft 100 is rotated in a direction indicated by an arrow curve, the eccentric cam 110 is rotated in the direction indicated by the arrow curve. The cam contact member 106 reciprocates in the X direction in response to the rotation of the eccentric cam 110 in the direction indicated by the arrow curve. The movement portion 40 reciprocates in the X direction with respect to the fixing portion 42 in response to the reciprocation of the cam contact member 106 in the X direction.

The X moving mechanism 240 shown in FIG. 14 is used in a case of finely adjusting the position of the head module 12 with respect to the bar frame 14 shown in FIG. 2 in the X direction. In a case of finely adjusting the position of the head module 12 in the X direction with respect to the bar frame 14, the position of the head module 12 can be understood by monitoring the output signal of the position detection sensor 210 shown in FIG. 13.

Figure 15:
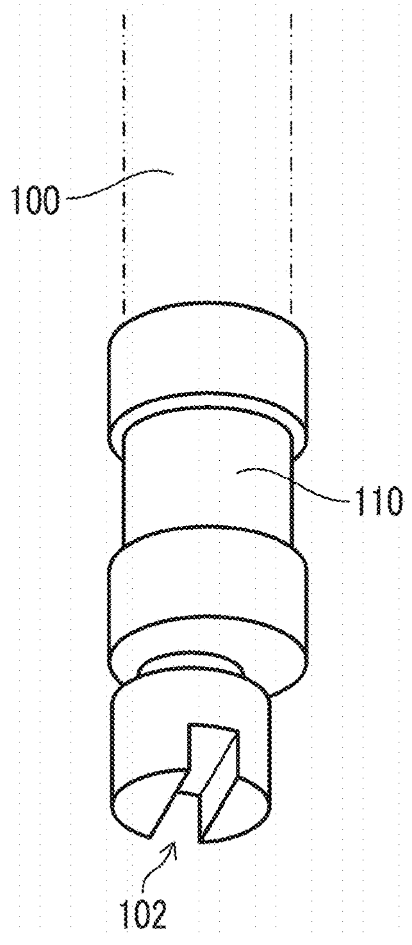
FIG. 15 is a perspective view of an eccentric cam shown in FIG. 14.

FIG. 15 is a perspective view of the eccentric cam shown in FIG. 14. FIG. 15 is an enlarged view of the eccentric cam 110 shown in FIGS. 7 and 14. FIG. 15 shows the groove 102 formed at the end of the cam shaft 100. A cam member having a shape other than the eccentric cam 110, such as a conical cam, may be applied to the X moving mechanism 240 shown in FIG. 14. It should be noted that the X moving mechanism described in the embodiment is an example of a first direction movement portion.

[Disposition of Position Detection Sensor and X Moving Mechanism]

Figure 16:
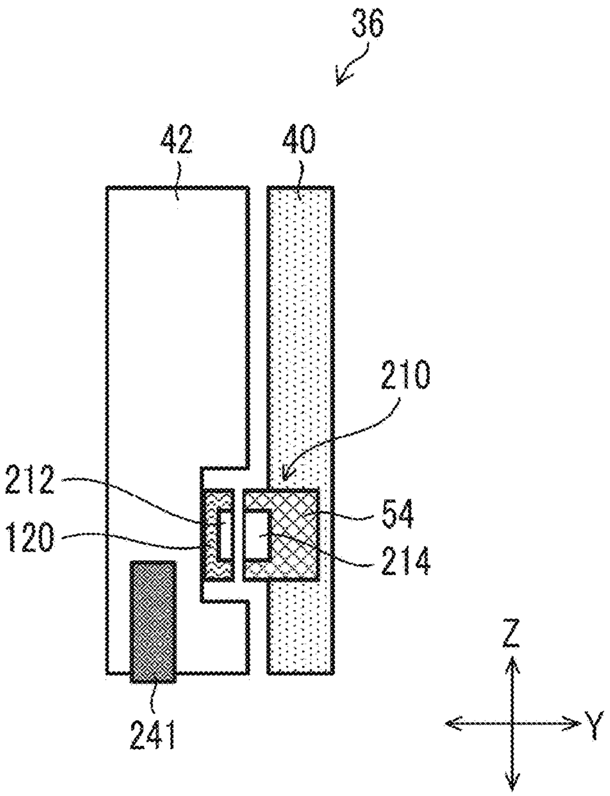
FIG. 16 is a schematic view showing an example of the disposition of the position detection sensor and the X moving mechanism.
Figure 17:
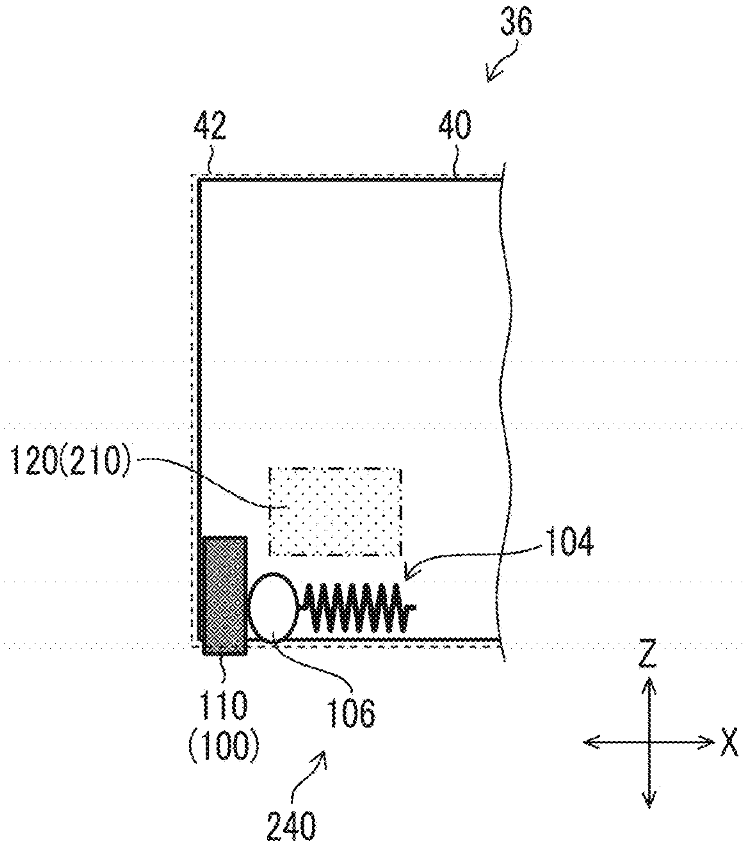
FIG. 17 is a view of the clamp assembly shown in FIG. 16 as viewed in a Y direction.

FIG. 16 is a schematic view showing an example of the disposition of the position detection sensor and the X moving mechanism. FIG. 17 is a view of the clamp assembly 36 shown in FIG. 16 as viewed from the Y direction. In FIG. 16, a region in which the X moving mechanism 240 is disposed is shown as an X moving mechanism disposition region 241. In FIG. 17, the Hall element 212 is not shown.

It is preferable that the position detection sensor 210 and the X moving mechanism 240 are disposed at positions close to a jetting surface of the head module 12. As a result, a landing position of the liquid droplet jetted from the head module 12 can be accurately adjusted.

The X moving mechanism 240 rotates the eccentric cam 110 manually or by using power of a motor or the like. It is preferable that the X moving mechanism 240 is disposed at a position on the lower side in the Z direction with respect to the position of the position detection sensor 210 in consideration of the fact that accessing the groove 102 of the cam shaft 100 is facilitated in a case in which the eccentric cam 110 is rotated.

[Actions and Effects of Liquid Jet Head According to First Embodiment]

With the liquid jet head according to the first embodiment, the following actions and effects can be obtained.

[1]

The rolling guide is applied to the guide 200 that functions as the guide portion in a case of moving the movement portion 40 on which the head module 12 is mounted with respect to the fixing portion 42 that is joined to the bar frame 14 of the liquid jet head 10. As a result, the accuracy of the position adjustment of the movement portion 40 in a case of moving the movement portion 40 with respect to the fixing portion 42 can be improved.

[2]

The guides 200 are disposed in a distributed manner. As a result, space saving is ensured, and access from the outside is facilitated. Also, the defined rigidity of the clamp assembly 36 can be ensured.

[3]

The position detection sensor 210 that detects the position of the movement portion 40 in the X direction with respect to the fixing portion 42 is provided. As a result, in a case of adjusting the position of the head module 12 mounted on the movement portion 40 in the X direction, the moving amount of the head module 12 in the X direction can be understood, and the accuracy of the position adjustment of the head module 12 can be improved.

[4]

The position detection sensor 210 and the X moving mechanism 240 are disposed on a side of the clamp assembly 36 close to the nozzle surface of the head module 12. As a result, a landing position of the liquid droplet jetted from the head module 12 can be accurately adjusted.

[5]

The X moving mechanism 240 is disposed at the lower end of the clamp assembly 36. As a result, accessing the groove 102 of the cam shaft 100 provided in the X moving mechanism 240 is facilitated.

[Liquid Jet Head According to Second Embodiment]

Figure 18:
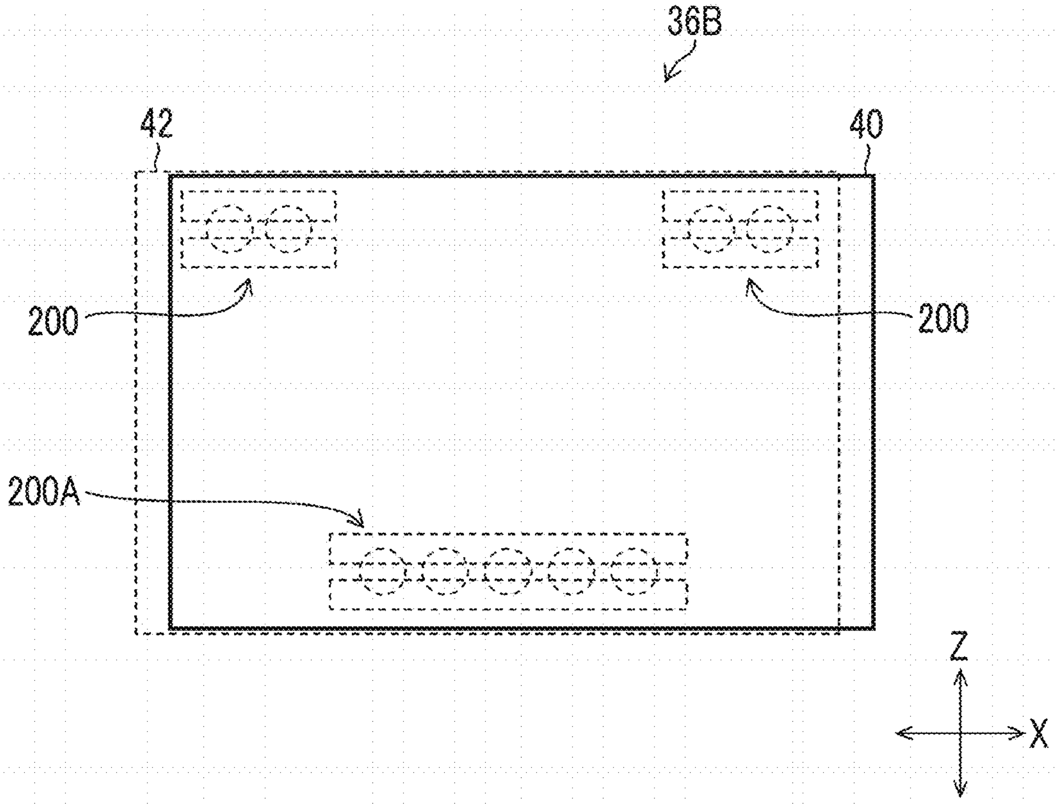
FIG. 18 is a schematic view of a clamp assembly showing a disposition example of a guide member applied to a liquid jet head according to a second embodiment.

FIG. 18 is a schematic view of a clamp assembly showing a disposition example of a guide member applied to a liquid jet head according to a second embodiment. FIG. 18 is a view of the clamp assembly 36 as viewed from the fixing portion 42 side in the Y direction, as in FIG. 11.

A clamp assembly 36B applied to the liquid jet head according to the second embodiment comprises the two guides 200 and the one guide 200A that function as the guides in a case of moving the movement portion 40 with respect to the fixing portion 42. The two guides 200 and the one guide 200A have the total length in the X direction that is shorter than the total length of the clamp assembly 36B in the X direction. The guide 200A has a structure in which the total length in the X direction is longer than that of the guide 200.

The guide 200 is disposed at an upper corner in the Z direction in FIG. 18, which is one of four corners of the clamp assembly 36B, as in the two guides 200 on the upper side in the Z direction shown in FIG. 11. On the other hand, the guide 200A is disposed at a position of the end portion in the Z direction on a side opposite to the guide 200, that is, a position of the central portion in the X direction. The guide 200A may be disposed at any one of one corner or the other corner in the X direction.

Here, the center portion in the X direction can be understood as a region including the center of the clamp assembly 36B in the X direction, and a region including the central portion of the two guides 200 in the X direction. Of course, the guides 200A may be disposed in the vicinity of one end and the vicinity of the other end of the X direction corresponding to at least any one of the internal structure of the movement portion 40 or the internal structure of the fixing portion 42. The vicinity of the end referred herein can be understood as a region on an outer side in the X direction of the central portion in the X direction.

[Actions and Effects of Liquid Jet Head According to Second Embodiment]

With the clamp assembly 36B applied to the liquid jet head according to the second embodiment, the defined accuracy in the movement of the movement portion 40 with respect to the fixing portion 42 is ensured, and the number of the guides 200 and the like that are disposed in a distributed manner can be relatively reduced. Also, a region in which the access from the outside is possible can be relatively expanded.

[Liquid Jet Head According to Third Embodiment]

Figure 19:
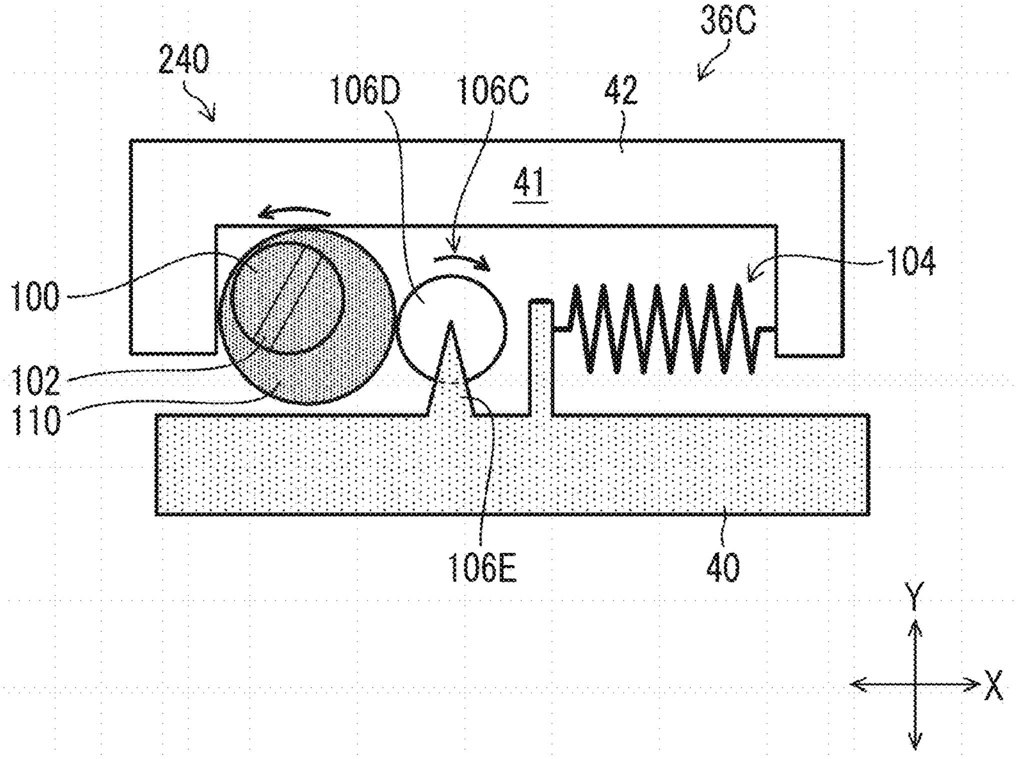
FIG. 19 is a schematic view of an X moving mechanism applied to a liquid jet head according to a third embodiment.

FIG. 19 is a schematic view of an X moving mechanism applied to a liquid jet head according to a third embodiment. FIG. 19 is a view of a clamp assembly 36C viewed in the Z direction from the bottom surface 41 of the clamp assembly 36C as in FIG. 14.

A cam contact member 106C shown in FIG. 19 comprises a rolling element member 106D and a rolling element support member 106E. An internal force in the rotation direction is generated between the eccentric cam 110 shown in FIG. 14 and the cam contact member 106, and the position accuracy in the movement of the fixing portion 42 with respect to the movement portion 40 may decrease. That is, in a case in which the frictional force is generated between the eccentric cam 110 shown in FIG. 14 and the cam contact member 106, a force to press the movement portion 40 in the Y direction can be applied.

On the other hand, in the cam contact member 106C shown in FIG. 19, the rolling element member 106D rotates in a direction in which an arrow curve is directed in response to the rotation of the eccentric cam 110. As a result, the frictional force generated between the eccentric cam 110 and the cam contact member 106C is suppressed.

A bearing can be applied to the rolling element member 106D. In addition, a solid lubricant can be applied to at least any one of the surface of the eccentric cam 110 shown in FIG. 14 or the surface of the cam contact member 106. Examples of the treatment in which the solid lubricant is applied include a baking coating treatment of molybdenum oxide, and graphite.

It should be noted that the baking coating treatment of the molybdenum oxide, the graphite, and the like described in the embodiment is an example of a surface treatment of imparting a lubricity to at least one of a surface of the cam member or a surface of the contact member.

[Actions and Effects of Liquid Jet Head According to Third Embodiment]

With the clamp assembly 36B applied to the liquid jet head according to the third embodiment, the frictional force generated between the eccentric cam 110 and the cam contact member 106C is suppressed. As a result, a certain position accuracy in the movement of the fixing portion 42 with respect to the movement portion 40 can be ensured.

[Liquid Jet Head According to Fourth Embodiment]

Figure 20:
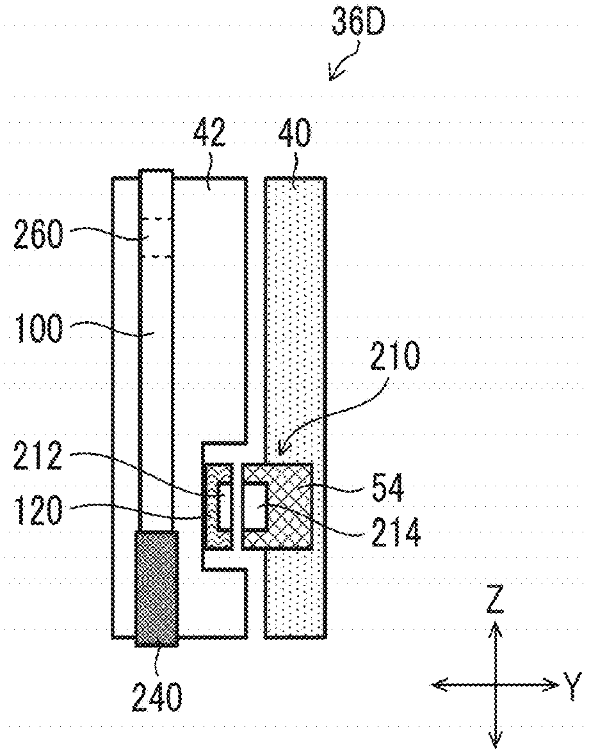
FIG. 20 is a schematic view of an X moving mechanism applied to a liquid jet head according to a fourth embodiment.
Figure 21:
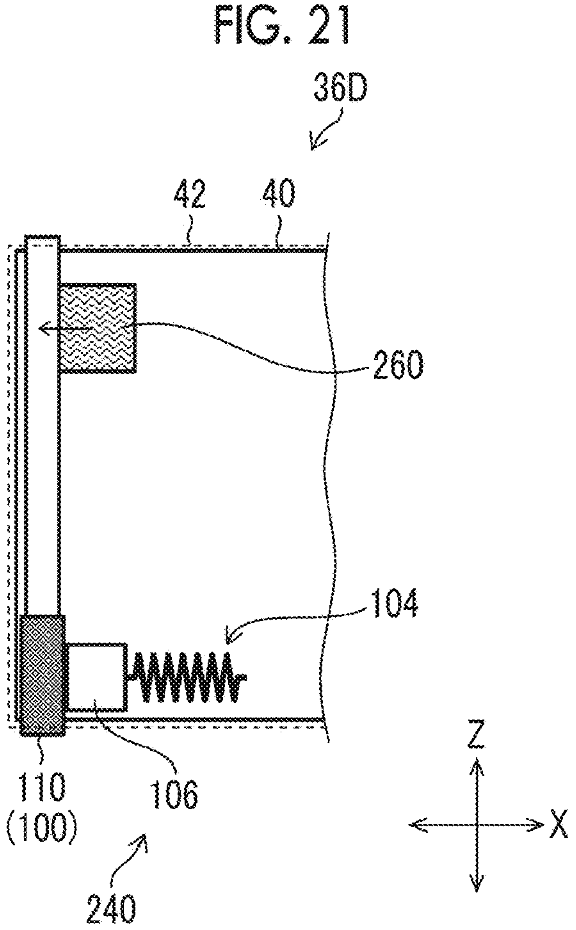
FIG. 21 is a view of a clamp assembly shown in FIG. 20 as viewed in the Y direction.

FIG. 20 is a schematic view of an X moving mechanism applied to a liquid jet head according to a fourth embodiment. FIG. 21 is a view of a clamp assembly shown in FIG. 20 as viewed in the Y direction. In a clamp assembly 36D shown in FIGS. 20 and 21, a slip stopper member 260 abuts on the cam shaft 100 that rotates the eccentric cam 110 from the X direction.

A direction in which the slip stopper member 260 abuts on the cam shaft 100 can be a direction parallel to a direction in which the X movement spring 104 biases the movement portion 40. FIG. 21 shows a direction in which the slip stopper member 260 abuts on the cam shaft 100 by using an arrow line.

As the slip stopper member 260, an elastic member, such as rubber and a plate spring, can be applied. For the disposition of the slip stopper member 260, an end on a side of the cam shaft 100 opposite to the eccentric cam 110 is applied. It should be noted that the slip stopper member 260 described in the embodiment is an example of a frictional force applying portion that applies a frictional force to a rotation shaft of the cam member.

[Actions and Effects of Liquid Jet Head According to Fourth Embodiment]

With the clamp assembly 36B applied to the liquid jet head according to the fourth embodiment, the slip stopper member 260 abuts on the cam shaft 100. As a result, the resistance is generated in a case of rotating the cam shaft 100, and the stability in the rotation of the cam shaft 100 and the eccentric cam 110 can be improved.

[Application Example to Head Module Support Mechanism]

The clamp assembly 36 according to the above-described embodiment may be configured as the head module support mechanism that comprises one or more head modules and supports the head module to be movable in the X direction.

[Configuration Example of Printing System According to Embodiment]

Figure 22:
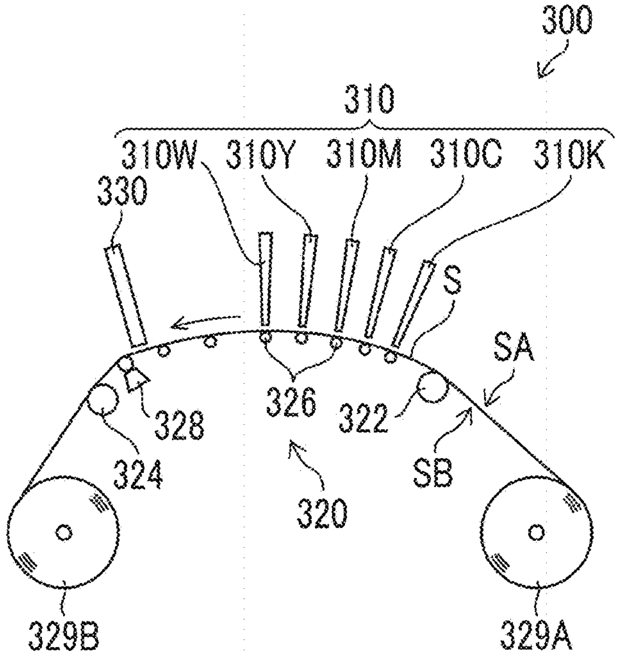
FIG. 22 is an overall configuration view showing a schematic configuration of a printing system according to the embodiment.

FIG. 22 is an overall configuration view showing a schematic configuration of a printing system according to the embodiment. An arrow line shown in FIG. 22 schematically shows the substrate transport direction, which is a transport direction of a film substrate S, in the ink jet printing system 300. The substrate transport direction is a direction in which the film substrate S travels, and is a direction along the traveling direction of the film substrate S.

The ink jet printing system 300 is a printing system to which a single-pass method is applied, and prints a color image on the film substrate S using an aqueous color ink. The film substrate S is a transparent medium used for a soft packaging and is an impermeable medium.

Examples of the film substrate S include oriented nylon (ONY), oriented polypropylene (OPP), and polyethylene terephthalate (PET). The ink jet printing system 300 creates a printed matter of back printing that is visible from a substrate support surface SB of the film substrate S on a side opposite to a printing surface SA. The ink jet printing system 300 can also create a printed matter of front printing that is visible from the printing surface SA.

The term "impermeable" means that a water-based primer liquid and an aqueous ink described later are impermeable. The soft package means a package using a material that is deformed depending on a shape of an article to be packaged. The term "transparent" means that the light transmittance of visible light is 30% or more and 100% or less, and is preferably 70% or more and 100% or less.

The ink jet printing system 300 comprises an ink jet head 310K, an ink jet head 310C, an ink jet head 310M, an ink jet head 310Y, and an ink jet head 310W.

The ink jet head 310K, the ink jet head 310C, the ink jet head 310M, the ink jet head 310Y, and the ink jet head 310W jet black ink, cyan ink, magenta ink, yellow ink, and white ink, respectively. Hereinafter, in a case in which it is not necessary to distinguish between the ink jet head 310K and the like, the ink jet head 310K and the like will be referred to as the ink jet head 310. The ink jet head 310 described with reference to FIGS. 1 to 21 can be applied to the liquid jet head 10.

A line type head in which a plurality of nozzles are disposed over the total length of the film substrate S in the substrate width direction is applied to the ink jet head 310. It should be noted that a serial type head may be applied to the ink jet head 310. The substrate width direction is a direction orthogonal to the substrate transport direction and parallel to the printing surface of the film substrate S.

The aqueous ink jetted from the ink jet head 310 means an ink in which a colorant such as a pigment is dissolved or dispersed in a solvent soluble in water. As the pigment of the aqueous ink, an organic pigment is used. The viscosity of the aqueous ink is 0.5 centipoise or more and 5.0 centipoise or less.

The ink jet head 310 jets the color ink onto the printing surface SA of the film substrate S transported by the transport device 320 to print the color image on the film substrate S. The white ink forms a white background image on the film substrate S. It should be noted that a plurality of the ink jet heads 310W that jet the aqueous white ink may be provided.

The ink jet head 310 is applied with the disposition and the posture such that the nozzle surface for jetting the ink faces a substrate transport surface of a substrate transport path which is a transport path of the film substrate S. The ink jet heads 310 are disposed at equal intervals along the substrate transport direction.

Although FIG. 22 shows an aspect in which the aqueous inks of four colors are applied, the ink colors are not limited to the four colors of black, cyan, magenta, and yellow. For example, an aspect in which a light-colored ink such as light magenta and light cyan is applied, and an aspect in which a special color ink such as green, orange, violet, clear, and metallic is applied can be applied. In addition, the disposition order of the ink jet head of each color is not limited to the example shown in FIG. 22.

The ink jet printing system 300 comprises a scanner 330. The scanner 330 comprises an imaging device that images a test pattern image printed on the printing surface of the film substrate S, and converts the captured image into an electric signal.

Examples of the imaging device include a CCD image sensor and a color CMOS image sensor. It should be noted that CCD is an abbreviation for a charge coupled device. CMOS is an abbreviation for complementary metal oxide semiconductor.

Imaging data output from the scanner 330 is analyzed by an imaging data analysis unit. The ink jet printing system 300 specifies an abnormal nozzle, such as a non-jetting nozzle, based on the analysis result of the imaging data. It should be noted that the imaging data analysis unit is not shown.

A roll-to-roll method is applied as the method of transporting the film substrate S via the transport device 320. The transport device 320 comprises a driving roller 322 and a driving roller 324. The driving roller 322 and the driving roller 324 are coupled to a rotation shaft of a motor which is a driving source, and rotate in response to the rotation of the motor.

The transport device 320 comprises a plurality of pass rollers 326. The plurality of pass rollers 326 are disposed along the transport path. The transport device 320 comprises a tension pickup 328. The tension pickup 328 detects the tension applied to the film substrate S. The ink jet printing system 300 can adjust the tension applied to the film substrate S during the transport, based on the detection result of the tension pickup 328.

The film substrate S is pulled out from a feeding roll 329A, is transported with the substrate support surface SB being supported by the driving roller 322, the plurality of the pass rollers 326, and the driving roller 324, and is wound around a winding roll 329B.

In the present embodiment, the roll-to-roll method is described as the method of transporting the film substrate S, but a method of transporting the substrate may be a drum transport method, a belt transport method, or the like. In addition, a sheet-like substrate may be used as the film substrate S. A paper medium may be used instead of the film substrate S. It should be noted that the ink jet printing system 300 described in the embodiment is an example of a liquid jet system. The transport device 320 described in the embodiment is an example of a relative movement device that moves the substrate and the liquid jet head relative to each other.

The ink applied to the ink jet printing system 300 is not limited to the aqueous ink. For example, an ink using an organic solvent may be applied. In the ink jet printing system 300, an ultraviolet-curable ink may be used. The ultraviolet-curable ink is an ink cured by irradiation with ultraviolet rays. The ink jet printing system 300 in which the ultraviolet-curable ink is used is provided with an ultraviolet ray irradiation device comprising an ultraviolet ray source at a position between the ink jet head 310W and the scanner 330 in the transport path of the film substrate S. It should be noted that the ultraviolet-curable ink can be referred to as a UV ink using UV, which is an abbreviation for ultraviolet rays in English.

The ink jet printing system 300 may comprise a pre-coating device and a drying device. The pre-coating device applies a pre-coating liquid onto the printing surface SA of the film substrate S. The pre-coating device may comprise a pre-coating drying device. The pre-coating drying device dries the pre-coating liquid applied onto the film substrate S. As the pre-coating liquid, a liquid containing a component which insolubilizes or thickens the aqueous ink, such as an aqueous primer liquid, can be applied.

The ink jet printing system 300 may comprise a drying device. The drying device dries the aqueous ink adhering to the printing surface SA of the film substrate S. The drying device comprises a blast device, a heater device, and the like.

Figure 23:
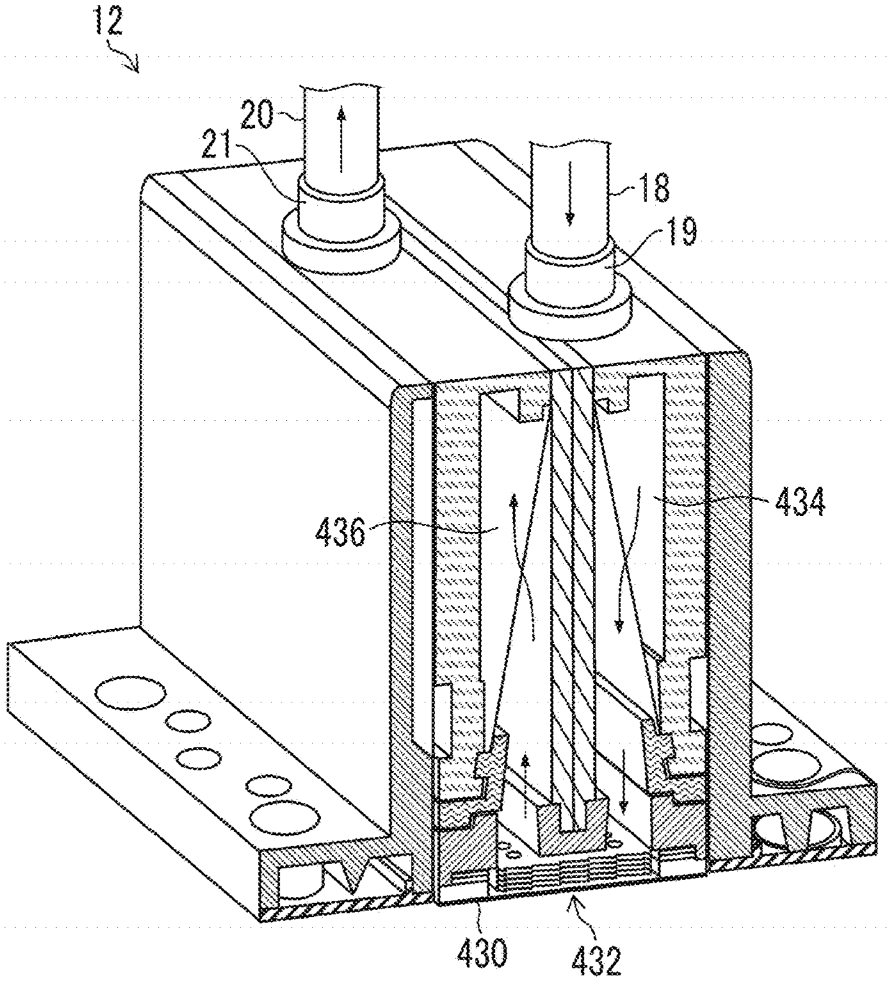
FIG. 23 is a perspective view of a head module and is a view including a partial cross-sectional view.

FIG. 23 is a perspective view of the head module and is a view including a partial cross-sectional view. The head module 12 includes an ink supply unit consisting of an ink supply chamber 434, an ink circulation chamber 436, and the like on the upper surface side in FIG. 23 which is opposite to the nozzle surface 432 of the nozzle plate 430.

The ink supply chamber 434 is connected to a buffer tank via the ink supply port 19 and a supply flow channel tube 18. The ink circulation chamber 436 is connected to the buffer tank via the ink circulation port 21 and the circulation flow channel tube 20. It should be noted that the buffer tank is not shown.

Figure 24:
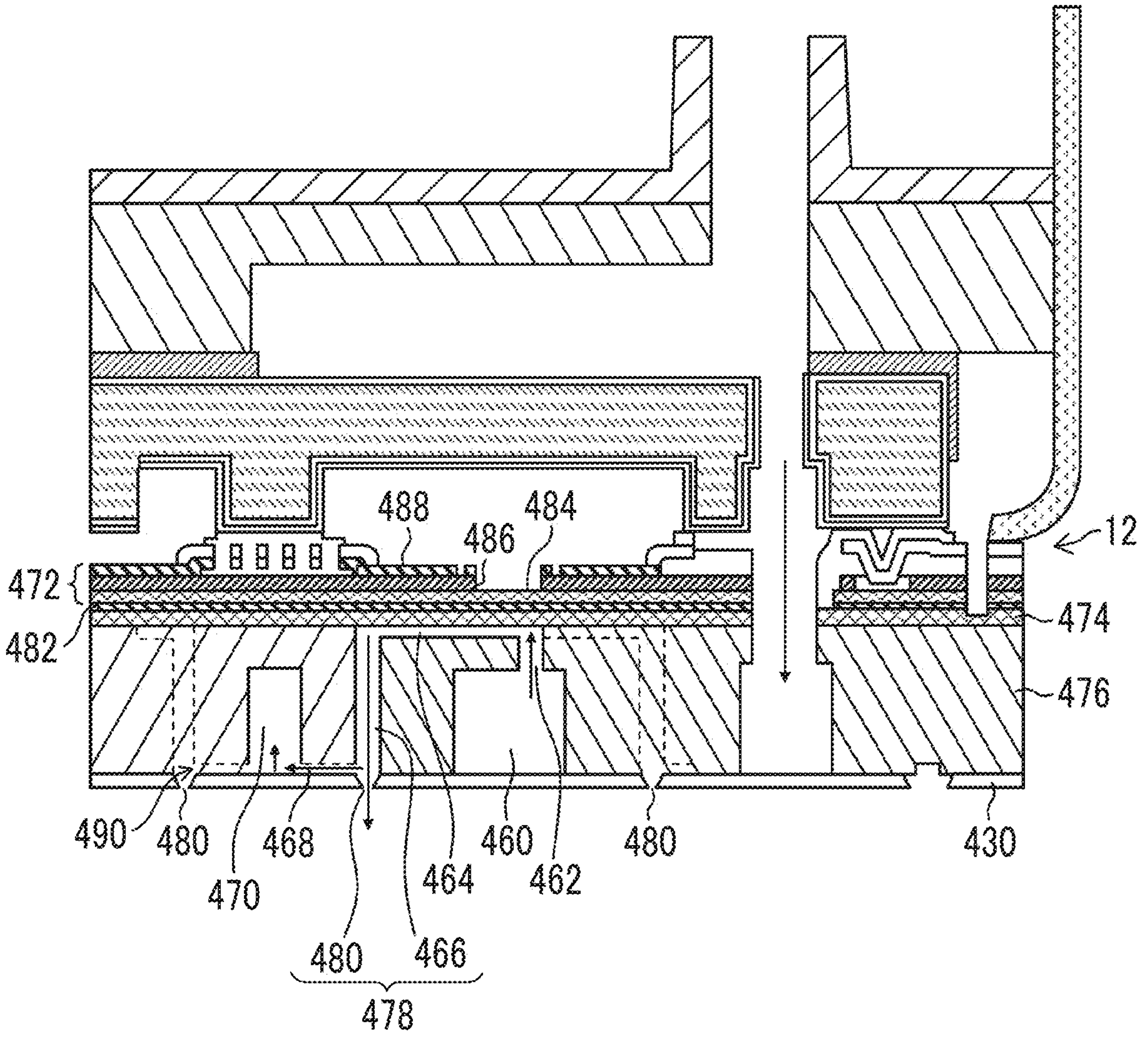
FIG. 24 is a cross-sectional view showing an internal structure of the head module.

FIG. 24 is a cross-sectional view showing an internal structure of the head module. The head module 12 comprises an ink supply path 460, an individual supply path 462, a pressure chamber 464, a nozzle communication path 466, an individual circulation flow channel 468, a common circulation flow channel 470, a piezoelectric element 472, and a vibration plate 474.

The ink supply path 460, the individual supply path 462, the pressure chamber 464, the nozzle communication path 466, the individual circulation flow channel 468, and the common circulation flow channel 470 are formed in a flow channel structure 476. A nozzle portion 478 includes a nozzle opening 480 and a nozzle communication path 466. The nozzle communication path 466 is a flow channel constituting a jetting element, and corresponds to a flow channel communicating with the nozzle opening 480.

The individual supply path 462 is a flow channel that connects the pressure chamber 464 and the ink supply path 460. The nozzle communication path 466 is a flow channel that connects the pressure chamber 464 and the nozzle opening 480. The individual circulation flow channel 468 is a flow channel that connects the nozzle communication path 466 and the common circulation flow channel 470.

The vibration plate 474 is disposed on the flow channel structure 476. The piezoelectric element 472 is disposed on the vibration plate 474 via an adhesive layer 482. The piezoelectric element 472 has a laminated structure of a lower electrode 484, a piezoelectric layer 486, and an upper electrode 488. It should be noted that the lower electrode 484 may be referred to as a common electrode, and the upper electrode 488 may be referred to as an individual electrode.

The upper electrode 488 is an individual electrode that is patterned corresponding to a shape of each pressure chamber 464, and the piezoelectric element 472 is provided in each pressure chamber 464. The piezoelectric element 472 corresponds to an energy generation element constituting the jetting element.

The ink supply path 460 communicates with the ink supply chamber 434 shown in FIG. 23. The ink is supplied from the ink supply path 460 to the pressure chamber 464 via the individual supply path 462. The drive voltage is applied to the upper electrode 488 of the piezoelectric element 472 as the operation target in accordance with the image data, the piezoelectric element 472 and the vibration plate 474 are deformed, and the volume of the pressure chamber 464 is changed. The head module 12 jets the ink liquid droplet from the nozzle opening 480 via the nozzle communication path 466 in response to the pressure change accompanying the change in the volume of the pressure chamber 464.

The pressure chamber 464 corresponding to each of the nozzle openings 480 has a planar shape of a substantially square shape, an outlet port to the nozzle opening 480 is disposed at one of both corner portions on a diagonal line, and the individual supply path 462, which is an inlet of the ink, is disposed at the other thereof. The shape of the pressure chamber is not limited to square. The planar shape of the pressure chamber may be various forms such as a rectangle such as a rhombus and a quadrangle, a pentagon, a hexagon or other polygons, a circle, and an ellipse.

The nozzle communication path 466 is formed with a circulation outlet 490. The nozzle communication path 466 communicates with the individual circulation flow channel 468 via the circulation outlet 490. Among the inks held in the nozzle portion 478, an ink that is not used for jetting is recovered in the common circulation flow channel 470 via the individual circulation flow channel 468.

The common circulation flow channel 470 communicates with the ink circulation chamber 436 shown in FIG. 23. The ink is recovered in the common circulation flow channel 470 via the individual circulation flow channel 468. As a result, the thickening of the ink held in the nozzle portion 478 during a non-jetting period is prevented.

FIG. 24 shows the piezoelectric element 472 having a structure that is individually separated corresponding to each of a plurality of the nozzle portions 478. Of course, a structure may be applied in which the piezoelectric layer 486 is integrally formed with respect to the plurality of nozzle portions 478, the individual electrodes are formed corresponding to each of the plurality of nozzle portions 478, and an active region is formed in each of the nozzle portions 478.

Two-dimensional disposition is applied to the disposition of the nozzle opening 480 on the nozzle surface 432. Examples of the two-dimensional disposition include matrix disposition. The disposition of the nozzle opening 480 is not limited to the matrix, and the disposition of one row, the zigzag disposition of two rows, or the like can be applied.

The ink jet printing system 300 shown in FIG. 22 comprises a control device. A computer can be applied to the control device. A form of the computer may be a server, a personal computer, a workstation, a tablet terminal, and the like.

The control device comprises one or more processors and one or more memories, and the processor executes a program stored in the memory to realize various functions. It should be noted that the term "program" is synonymous with the term "software".

The memory can be configured as a main storage device of a computer-readable medium which is a non-transitory tangible object. The computer-readable medium which is the non-transitory tangible object includes a storage which is an auxiliary storage device. A semiconductor memory, a hard disk apparatus, a solid state drive apparatus, and the like may be applied to the computer-readable medium. Any combination of a plurality of apparatuses may be applied to the computer-readable medium.

It should be noted that the hard disk apparatus can be referred to as HDD that is an abbreviation for hard disk drive in English. The solid state drive apparatus can be referred to as SSD that is an abbreviation for solid state drive in English.

The control device communicates data to and from an external device via the communication interface. Various standards, such as universal serial bus (USB), may be applied to the communication interface. Either wired communication or wireless communication may be applied to a communication form of the communication interface.

Here, examples of the hardware structure of the processor include a CPU, a GPU, a programmable logic device (PLD), and an application specific integrated circuit (ASIC). The CPU is a general-purpose processor that performs the program and acts as various functional units. The GPU is a processor specialized in the image processing.

The PLD is a processor in which a configuration of an electric circuit can be changed after manufacturing the device. Examples of the PLD include a field programmable gate array (FPGA). The ASIC is a processor comprising a dedicated electric circuit specifically designed to execute specific processing.

One processing unit may be configured by one of these various processors or may be configured by two or more processors of the same type or different types. Examples of a combination of the various processors include a combination of one or more FPGAs and one or more CPUs, and a combination of one or more FPGAs and one or more GPUs. As another example of the combination of the various processors, there is a combination of one or more CPUs and one or more GPUs.

A plurality of functional units may be configured by using one processor. As an example in which the plurality of functional units are configured by using one processor, there is an aspect in which one processor is configured by applying a combination of one or more CPUs and software, such as system on a chip (SoC) represented by the computer, such as a client or a server, and this processor is made to act as the plurality of functional units.

As another example in which the plurality of functional units are configured by using one processor, there is an aspect in which a processor that implements the functions of the entire system including the plurality of functional units by using one IC chip is used. It should be noted that IC is an abbreviation for an integrated circuit.

As described above, various functional units are configured by using one or more of the various processors described above as the hardware structure. Further, the hardware structure of these various processors is, more specifically, an electric circuit (circuitry) in which circuit elements, such as semiconductor elements, are combined.

In the embodiments of the present invention described above, the configuration elements can be changed, added, or deleted as appropriate without departing from the spirit of the present invention. The present invention is not limited to the embodiments described above, and various modifications can be made by those having ordinary knowledge in the field within the technical idea of the present invention.

EXPLANATION OF REFERENCES

10: liquid jet head
12: head module
14: bar frame
16: flexible substrate
18: supply flow channel tube
19: ink supply port
20: circulation flow channel tube
21: ink circulation port
30: module mount
30A: bottom surface portion
30B: rear surface portion
32: surface to which head module is attached
34: surface on side opposite to surface to which head module is attached
36: clamp assembly
36A: clamp assembly
36B: clamp assembly
36C: clamp assembly
36D: clamp assembly
38: projection structure
40: movement portion
41: bottom surface
42: fixing portion
42A: upper surface
42B: opening
42C: lower surface
44: surface to which module mount is attached
45: hole formed in movement portion
46: groove structure
47: lever
49A: beam portion
49B: beam portion
50: Y reference
51: Y reference
52: hole
54: magnet holder
56: body
60: X reference
64: hole
70: Y reference movement screw
80: Z reference
82: Z direction magnet
83: plate cam
84: plate cam guide
85: plate cam arm
86: holding claw
90: plate cam return spring
92: clamp spring
100: cam shaft
102: groove
104: X movement spring
104A: one end
104B: other end
106: cam contact member
106C: cam contact member
106D: rolling element member
106E: rolling element support member
110: eccentric cam
120: sensor holder
200: guide

200A: guide
201: first guide member
202: first groove
203: second guide member
204: second groove
205: through-hole
206: spherical structure
207: pressure adjustment screw
210: position detection sensor
212: Hall element
214: permanent magnet
240: X moving mechanism
260: slip stopper member
300: ink jet printing system
310: ink jet head
310C: ink jet head
310K: ink jet head
310M: ink jet head
310W: ink jet head
310Y: ink jet head
320: transport device
322: driving roller
324: driving roller
326: pass roller
328: tension pickup
329A: feeding roll
329B: winding roll
330: scanner
430: nozzle plate
432: nozzle surface
434: ink supply chamber
436: ink circulation chamber
460: ink supply path
462: individual supply path
464: pressure chamber
466: nozzle communication path
468: individual circulation flow channel
470: common circulation flow channel
472: piezoelectric element
474: vibration plate
476: flow channel structure
478: nozzle portion
480: nozzle opening
482: adhesive layer
484: lower electrode
486: piezoelectric layer
488: upper electrode
490: circulation outlet
S: film substrate
SA: printing surface
SB: substrate support surface

What is claimed is:

1. A head module support mechanism that supports plurality of head modules of a liquid jet head including the plurality of head modules, the head module support mechanism comprising:

a fixing portion that is joined to a frame of the liquid jet head;

a movement portion that supports the plurality of head modules and is supported to be movable in a first direction with respect to the fixing portion;

a first direction movement portion that moves the movement portion that supports the plurality of head modules in the first direction with respect to the fixing portion; and a guide portion that guides the movement portion with respect to the fixing portion and to which a rolling guide extending in the first direction is applied, wherein the head module support mechanism supports the plurality of head modules which are connected to each other in the first direction.

2. The head module support mechanism according to claim 1, wherein the guide portion includes a plurality of the rolling guides, and a total length of the rolling guide in the first direction is shorter than a total length of the fixing portion in the first direction.

3. The head module support mechanism according to claim 2, wherein a direction that is orthogonal to the first direction and in which the fixing portion and the movement portion are arranged is defined as a second direction, and a direction orthogonal to each of the first direction and the second direction is defined as a third direction, and the plurality of rolling guides are disposed in a distributed manner in the first direction and the third direction.

4. The head module support mechanism according to claim 3, wherein the plurality of rolling guides are respectively disposed at end portions in the first direction and end portions in the third direction.

5. The head module support mechanism according to claim 2, wherein the guide portion includes the plurality of rolling guides, and the total length of the rolling guide in the first direction corresponds to the total length of the fixing portion in the first direction.

6. The head module support mechanism according to claim 5, wherein a direction orthogonal to a second direction, which is orthogonal to the first direction and in which the fixing portion and the movement portion are arranged, is defined as a third direction, and the plurality of rolling guides are respectively disposed at end portions in the third direction.

7. The head module support mechanism according to claim 1, wherein the rolling guide includes a first guide member, a second guide member, and a rolling structure, and has a structure in which the rolling structure is interposed between a first groove formed in the first guide member and a second groove formed in the second guide member, and the first guide member and the second guide member are subjected to a hardening treatment on surfaces thereof.

8. The head module support mechanism according to claim 7, wherein a radical nitriding treatment is applied to the hardening treatment.

9. The head module support mechanism according to claim 1, further comprising:

a position detection unit that detects a position of the movement portion in the first direction with respect to the fixing portion.

10. The head module support mechanism according to claim 1, wherein the first direction movement portion includes a cam member, a contact member that abuts on the cam member and moves in the first direction in response to rotation of the cam member, and a biasing force applying member that applies a biasing force in a direction in which the contact member abuts on the cam member to the contact member.

11. The head module support mechanism according to claim 10, wherein a surface treatment of applying a lubricity to at least any one of a surface of the cam member or a surface of the contact member is performed.

12. The head module support mechanism according to claim 10, wherein a rolling element member is applied to the contact member.

13. The head module support mechanism according to claim 10, further comprising:

a frictional force applying portion that applies a frictional force to a rotation shaft of the cam member.

14. The head module support mechanism according to claim 1, wherein the plurality of head modules are joined to module support members, respectively, the fixing portion has groove structures formed on a surface joined to the module support members, and each of the module support members has a projection structure having a shape fitted to each of the groove structures and formed on a surface joined to the fixing portion.

15. The head module support mechanism according to claim 14, wherein each of the module support members includes a first member to which a head module is joined, and a second member in which the projection structure is formed, and each of the module support members has a structure in which the first member and the second member are orthogonal to each other.

16. A liquid jet head comprising:

a plurality of head modules;

a module support mechanism that supports the plurality of head modules; and a frame, wherein the module support mechanism includes a fixing portion that is joined to the frame, a movement portion that supports the plurality of head modules and is supported to be movable in a first direction with respect to the fixing portion, a first direction movement portion that moves the movement portion that supports the plurality of head modules in the first direction with respect to the fixing portion, and a guide portion that guides the movement portion with respect to the fixing portion and to which a rolling guide extending in the first direction is applied, and the module support mechanism supports the plurality of head modules which are connected to each other in the first direction.

17. A liquid jet system comprising:

a liquid jet head, wherein the liquid jet head includes a plurality of head modules, and a module support mechanism that supports the plurality of head modules, and the module support mechanism includes a fixing portion that is joined to a frame of the liquid jet head, a movement portion that supports the plurality of head modules and is supported to be movable in a first direction with respect to the fixing portion, a first direction movement portion that moves the movement portion that supports the plurality of head modules in the first direction with respect to the fixing portion, and a guide portion that guides the movement portion with respect to the fixing portion and to which a rolling guide extending in the first direction is applied, and the module support mechanism supports the plurality of head modules which are connected to each other in the first direction.

18. The liquid jet system according to claim 17, wherein a direction that is orthogonal to the first direction and in which the fixing portion and the movement portion are arranged is defined as a second direction, and the liquid jet system further comprises a relative movement device that moves a substrate to which a liquid jetted from the liquid jet head adheres and the liquid jet head relative to each other in the second direction.

* * * * *